US011346566B2

(12) United States Patent
Steele et al.

(10) Patent No.: US 11,346,566 B2
(45) Date of Patent: May 31, 2022

(54) SMART SYSTEM FOR MANHOLE EVENT SUPPRESSION SYSTEM

(71) Applicant: Novinium, Inc., Kent, WA (US)

(72) Inventors: James Steele, Kent, WA (US); Mark Newton, Wilmington, DE (US); Glen J. Bertini, Fox Island, WA (US)

(73) Assignee: NOVINIUM, INC., Kent, WA (US)

( * ) Notice: Subject to any disclaimer, the term of this patent is extended or adjusted under 35 U.S.C. 154(b) by 21 days.

(21) Appl. No.: 16/785,208

(22) Filed: Feb. 7, 2020

(65) Prior Publication Data

US 2020/0191421 A1 Jun. 18, 2020

Related U.S. Application Data

(63) Continuation of application No. 15/476,775, filed on Mar. 31, 2017, now Pat. No. 10,684,031.

(Continued)

(51) Int. Cl.
*E02D 29/12* (2006.01)
*E02D 29/14* (2006.01)
(Continued)

(52) U.S. Cl.
CPC .......... *F24F 11/0001* (2013.01); *E02D 29/12* (2013.01); *E02D 29/14* (2013.01);
(Continued)

(58) Field of Classification Search
CPC ...... F24F 11/0001; F24F 13/029; F24F 11/30; E05Y 2900/612; E02D 29/12; E02D 29/14; E02D 29/1436; E03F 5/08; E03F 5/24
(Continued)

(56) References Cited

U.S. PATENT DOCUMENTS

| 713,990 | A | 11/1902 | Keith |
| 1,163,189 | A | 12/1915 | Wolf |

(Continued)

FOREIGN PATENT DOCUMENTS

| AU | 2016277726 | 7/2017 |
| CA | 2952984 | 6/2017 |

(Continued)

OTHER PUBLICATIONS

Cniguard, "Explosions—Manhole Monitoring System," Apr. 8, 2016, Video retrieved from https://www.youtube.com/watch?v=wcg7M3DxIWI.

(Continued)

*Primary Examiner* — Vivek K Shirsat
*Assistant Examiner* — Ko-Wei Lin
(74) *Attorney, Agent, or Firm* — Davis Wright Tremaine LLP; George C. Rondeau, Jr.; Heather M. Colburn

(57) ABSTRACT

A system including a processor and sensor for installation inside an underground vault. The sensor monitors a parameter inside the vault and sends a monitoring signal to the processor. Based on the monitoring signal, the processor may provide data to a memory for storage and/or control signals to an interface for transmission to an external device located within the vault. The control signals instruct the external device to modify the environment inside the vault. The sensor may be positioned inside an enclosure, which is inside a housing. An air moving device moves air into or out of the enclosure thereby drawing air from the vault into the enclosure before the sensor monitors the parameter. A heat generating component may be positioned inside the housing and when generating heat prevents moisture from condensing therein. The system may include a power unit that draws power from a power source inside the vault.

24 Claims, 17 Drawing Sheets

Related U.S. Application Data

(60) Provisional application No. 62/316,230, filed on Mar. 31, 2016.

(51) Int. Cl.

| | | |
|---|---|---|
| *F24F 11/00* | (2018.01) | |
| *F24F 11/30* | (2018.01) | |
| *F24F 11/62* | (2018.01) | |
| *F24F 13/02* | (2006.01) | |
| *F24F 11/61* | (2018.01) | |
| *F24F 110/50* | (2018.01) | |
| *F24F 11/63* | (2018.01) | |

(52) U.S. Cl.
CPC .......... *E02D 29/1436* (2013.01); *F24F 11/30* (2018.01); *F24F 11/62* (2018.01); *F24F 13/02* (2013.01); *F24F 13/029* (2013.01); *F24F 11/61* (2018.01); *F24F 11/63* (2018.01); *F24F 2110/50* (2018.01)

(58) Field of Classification Search
USPC .............................................. 454/48, 49, 56
See application file for complete search history.

(56) References Cited

U.S. PATENT DOCUMENTS

| | | | |
|---|---|---|---|
| 2,156,166 A | 4/1939 | Smith | |
| 3,302,658 A | 2/1967 | Frees | |
| 3,610,524 A | 10/1971 | Wallen | |
| 3,864,437 A | 2/1975 | Blaszkowski | |
| 3,916,870 A | 11/1975 | Beavers | |
| 4,030,851 A | 6/1977 | Graybeal | |
| 4,101,236 A | 7/1978 | Meyer | |
| 4,285,269 A | 8/1981 | Pelsue et al. | |
| 4,315,579 A | 2/1982 | Martin, Jr. | |
| 4,408,421 A | 10/1983 | Pai | |
| 4,508,486 A | 4/1985 | Tinker | |
| 4,532,491 A | 7/1985 | Rau et al. | |
| 4,567,939 A | 2/1986 | Dumbeck | |
| 4,593,714 A | 6/1986 | Madden | |
| 4,953,450 A | 9/1990 | Remondino | |
| 5,051,022 A | 9/1991 | Bowman | |
| 5,062,735 A | 11/1991 | Gaudin | |
| 5,130,016 A | 7/1992 | Gavin | |
| 5,201,151 A | 4/1993 | LeBlanc et al. | |
| 5,209,697 A | 5/1993 | Hurst et al. | |
| 5,733,444 A | 3/1998 | Johnson | |
| 5,739,463 A | 4/1998 | Diaz et al. | |
| 5,820,828 A | 10/1998 | Ferone | |
| 5,911,537 A | 6/1999 | Pulver | |
| 5,980,065 A | 11/1999 | Wooderson | |
| 6,012,532 A | 1/2000 | Kiefer et al. | |
| 6,168,514 B1 | 1/2001 | Weston | |
| 6,338,637 B1 | 1/2002 | Muench, Jr. et al. | |
| 6,457,901 B1 | 10/2002 | Sondrup | |
| 6,489,554 B1 | 12/2002 | Bertini et al. | |
| 6,617,973 B1* | 9/2003 | Osterman | H01M 50/20 340/636.1 |
| 6,743,088 B2 | 6/2004 | Closkey | |
| 6,848,465 B1 | 2/2005 | Ledbetter | |
| 6,851,225 B1 | 2/2005 | Harr et al. | |
| 7,195,504 B2 | 3/2007 | Bertini et al. | |
| 7,353,601 B1 | 4/2008 | Bertini | |
| 7,611,748 B2 | 11/2009 | Bertini | |
| 7,768,413 B2 | 8/2010 | Kosuge et al. | |
| 7,932,466 B2 | 4/2011 | Sanders | |
| 7,944,352 B2 | 5/2011 | Drake et al. | |
| 8,493,223 B2* | 7/2013 | Zadnikar | H04N 7/18 340/632 |
| 8,851,791 B1 | 10/2014 | Putnam | |
| 8,926,414 B1* | 1/2015 | Kirkpatrick | G06F 1/20 454/184 |
| 8,946,548 B2 | 2/2015 | Sanders | |
| 8,976,038 B2 | 3/2015 | Miller, II et al. | |
| 9,100,728 B2 | 8/2015 | Higgins et al. | |
| 9,151,431 B2 | 10/2015 | Kiest, Jr. | |
| 9,276,399 B2 | 3/2016 | Sales Casals et al. | |
| 9,541,432 B2 | 1/2017 | Kertesz et al. | |
| 9,546,466 B2 | 1/2017 | Wander | |
| 9,605,403 B1 | 3/2017 | Putnam | |
| 2002/0166759 A1 | 11/2002 | Mabry et al. | |
| 2005/0109764 A1* | 5/2005 | Kopel | G05D 23/1909 219/494 |
| 2006/0284857 A1* | 12/2006 | Oh | G06F 1/3203 345/173 |
| 2008/0173467 A1 | 7/2008 | Bertini et al. | |
| 2009/0027061 A1 | 1/2009 | Curt et al. | |
| 2011/0148647 A1* | 6/2011 | Miller, II | E02D 29/1481 340/686.1 |
| 2011/0244702 A1 | 10/2011 | Bertini et al. | |
| 2012/0028560 A1 | 2/2012 | Nikolic | |
| 2012/0227168 A1 | 9/2012 | Paoluccio et al. | |
| 2012/0270488 A1* | 10/2012 | Fujimura | F24F 11/0001 454/56 |
| 2013/0092029 A1 | 4/2013 | Morgan et al. | |
| 2014/0150286 A1 | 6/2014 | Jadhav et al. | |
| 2014/0227954 A1 | 8/2014 | Sone et al. | |
| 2015/0056908 A1* | 2/2015 | Chapel | H05K 7/02 454/184 |
| 2015/0075201 A1* | 3/2015 | Park | F25D 23/006 62/262 |
| 2015/0118946 A1* | 4/2015 | Yeon | B60H 1/00828 454/75 |
| 2015/0276818 A1 | 10/2015 | Nulty | |
| 2015/0323510 A1* | 11/2015 | Huynh | H01L 23/293 73/23.34 |
| 2015/0345819 A1 | 12/2015 | Ostrovsky | |
| 2016/0274176 A1* | 9/2016 | Di Stefano | G01R 31/1227 |
| 2016/0356521 A1 | 12/2016 | Bertini et al. | |
| 2016/0356522 A1 | 12/2016 | Bertini et al. | |
| 2017/0228998 A1 | 8/2017 | Fu et al. | |
| 2019/0166413 A1 | 5/2019 | Klinger et al. | |

FOREIGN PATENT DOCUMENTS

| | | |
|---|---|---|
| CN | 204475375 | 7/2015 |
| CN | 106284422 | 1/2017 |
| DE | 1010464 | 6/1957 |
| DE | 2857528 | 8/1980 |
| DE | 8419395 | 10/1984 |
| DE | 202007006848 | 9/2007 |
| EP | 0372545 | 6/1990 |
| EP | 0952263 | 10/1999 |
| EP | 1473414 | 11/2004 |
| EP | 1486619 | 12/2004 |
| EP | 1635000 | 3/2006 |
| EP | 3206028 | 8/2017 |
| FR | 2450912 | 10/1980 |
| GB | 2521217 | 6/2015 |
| JP | H03156035 | 7/1991 |
| JP | H06272268 | 9/1994 |
| JP | H0674155 | 10/1994 |
| JP | H09512629 | 12/1997 |
| JP | H11118649 | 4/1999 |
| JP | H11148880 | 6/1999 |
| JP | 2000161600 | 6/2000 |
| JP | 200494863 | 4/2004 |
| JP | 2005504947 | 2/2005 |
| JP | 2005282347 | 10/2005 |
| JP | 2009075823 | 4/2009 |
| JP | 2009281982 | 12/2009 |
| JP | 2012063943 | 3/2012 |
| JP | 2012162852 | 8/2012 |
| JP | 2013167078 | 8/2013 |
| JP | 2015042816 | 3/2015 |
| KR | 20060083777 | 7/2006 |
| KR | 10-2007-0087745 | 8/2007 |
| KR | 10-2008-0098988 | 11/2008 |
| KR | 10-2009-0131361 | 12/2009 |
| KR | 10-2010-0115626 | 10/2010 |
| KR | 10-2014-0050133 | 8/2014 |

(56) References Cited

FOREIGN PATENT DOCUMENTS

| WO | 2004018787 | 3/2004 | | |
|----|------------|--------|---|---|
| WO | 2016033653 | 3/2016 | | |
| WO | WO-2016033653 A1 * | 3/2016 | ............. | E02D 29/12 |

OTHER PUBLICATIONS

NoviniumInc, "Webinar: Causes, Consequences and Protecting Your System from Manhole Events," Mar. 7, 2017, Video retrieved from https://www.youtube.com/watch?v=kTwwLiw7MAI.

Rudin et al., "A process for predicting manhole events in Manhattan," Mach Learn, 2010, 80: 1-31.

Siemens, Inc., Report #R55-11, "Investigation of Manhole Incidents Occurring Around and in the Underground Distribution System of the Potomac Electric Power Company," Jun. 30, 2011.

Non-Final Office Action, dated Mar. 28, 2018, received in U.S. Appl. No. 15/084,321.

Final Office Action, dated Oct. 15, 2018, received in U.S. Appl. No. 15/084,321.

Non-Final Office Action, dated Aug. 22, 2019, received in U.S. Appl. No. 15/476,775.

Non-Final Office Action, dated Oct. 31, 2019, received in U.S. Appl. No. 15/084,321.

International Search Report and Written Opinion, dated Aug. 5, 2016, received in International Application No. PCT/US2016/030282.

International Search Report and Written Opinion, dated Aug. 30, 2016, received in International Application No. PCT/US2016/035934.

International Search Report and Written Opinion, dated Sep. 7, 2017, received in International Application No. PCT/US2017/030255.

International Search Report and Written Opinion, dated Sep. 12, 2017, received in International Application No. PCT/US2017/25601.

Extended European Search Report, dated Apr. 17, 2019, received in European Application No. 16803923.8.

Extended European Search Report, dated Oct. 28, 2019, received in European Application No. 17776872.8.

Information Disclosure Statement Transmittal submitted herewith.

Final Office Action, dated Apr. 1, 2021, received in U.S. Appl. No. 16/114,697.

Office Action, dated Apr. 20, 2021, received in Japanese Application No. 2018-551138.

U.S. Appl. No. 15/084,321, filed Mar. 29, 2016.
U.S. Appl. No. 15/173,633, filed Jun. 4, 2016.
U.S. Appl. No. 15/581,405, filed Apr. 28, 2017.
U.S. Appl. No. 15/581,496, filed Apr. 28, 2017.
U.S. Appl. No. 15/581,585, filed Apr. 28, 2017.
U.S. Appl. No. 15/581,595, filed Apr. 28, 2017.
U.S. Appl. No. 15/581,890, filed Apr. 28, 2017.
U.S. Appl. No. 16/114,697, filed Aug. 28, 2018.
U.S. Appl. No. 16/162,260, filed Oct. 16, 2018.
U.S. Appl. No. 16/189,639, filed Nov. 13, 2018.
U.S. Appl. No. 16/190,832, filed Nov. 14, 2018.
U.S. Appl. No. 16/207,633, filed Dec. 3, 2018.
U.S. Appl. No. 16/208,098, filed Dec. 3, 2018.
U.S. Appl. No. 16/208,120, filed Dec. 3, 2018.
U.S. Appl. No. 16/208,219, filed Dec. 3, 2018.
U.S. Appl. No. 16/219,137, filed Dec. 13, 2018.
U.S. Appl. No. 16/234,246, filed Dec. 27, 2018.
U.S. Appl. No. 16/514,530, filed Jul. 17, 2019.

International Patent Application No. PCT/US2016/030282, filed Apr. 29, 2016.

International Patent Application No. PCT/US2016/035934, filed Jun. 4, 2016.

International Patent Application No. PCT/US2017/030255, filed Apr. 28, 2017.

McDermott, Mike, "London County Counsil small vented cover," https://www.flickr.com/photos/mikegmcdermott/23299770406/in/photostream/ (Year: 2013).

Non-Final Office Action, dated Aug. 27, 2020, received in U.S. Appl. No. 16/114,697.

Notice of Preliminary Rejection, dated Nov. 10, 2021, received in Korean Application No. 10-2017-7035686.

Non-Final Office Action, dated Mar. 10, 2022, received in U.S. Appl. No. 16/114,697.

* cited by examiner

SMART SYSTEM FOR MANHOLE EVENT SUPPRESSION SYSTEM

CROSS REFERENCE TO RELATED APPLICATION(S)

This application claims the benefit of U.S. Provisional Application No. 62/316,230, filed on Mar. 31, 2016, which is incorporated herein by reference in its entirety.

BACKGROUND OF THE INVENTION

Field of the Invention

The present invention is directed generally to underground control systems.

Description of the Related Art

Underground confined spaces can be hazardous. Therefore, a need exists for systems configured to monitor and control the environment inside such spaces. The present application provides these and other advantages as will be apparent from the following detailed description and accompanying figures.

BRIEF DESCRIPTION OF THE SEVERAL VIEWS OF THE DRAWING(S)

DETAILED DESCRIPTION OF THE INVENTION

Manhole Event Suppression System

Electrical manhole events are typically caused by a buildup of explosive gases inside a manhole vault. Manhole events include both minor incidents (such as smoke or small fires) and/or major events (such as sustained fires and explosions). At best, a minor incident is likely to cause an electrical power outage. At worst, a major event, such as an explosion, can occasionally propel a manhole cover skyward causing property damage, injuries, and even death.

A manhole event suppression system helps prevent manhole events. While many types of such systems may be operated, for ease of illustration, FIG. 1 is block diagram of a ventilation type manhole event suppression system 100 that ventilates or circulate air inside a manhole vault 12.

Figure 1:
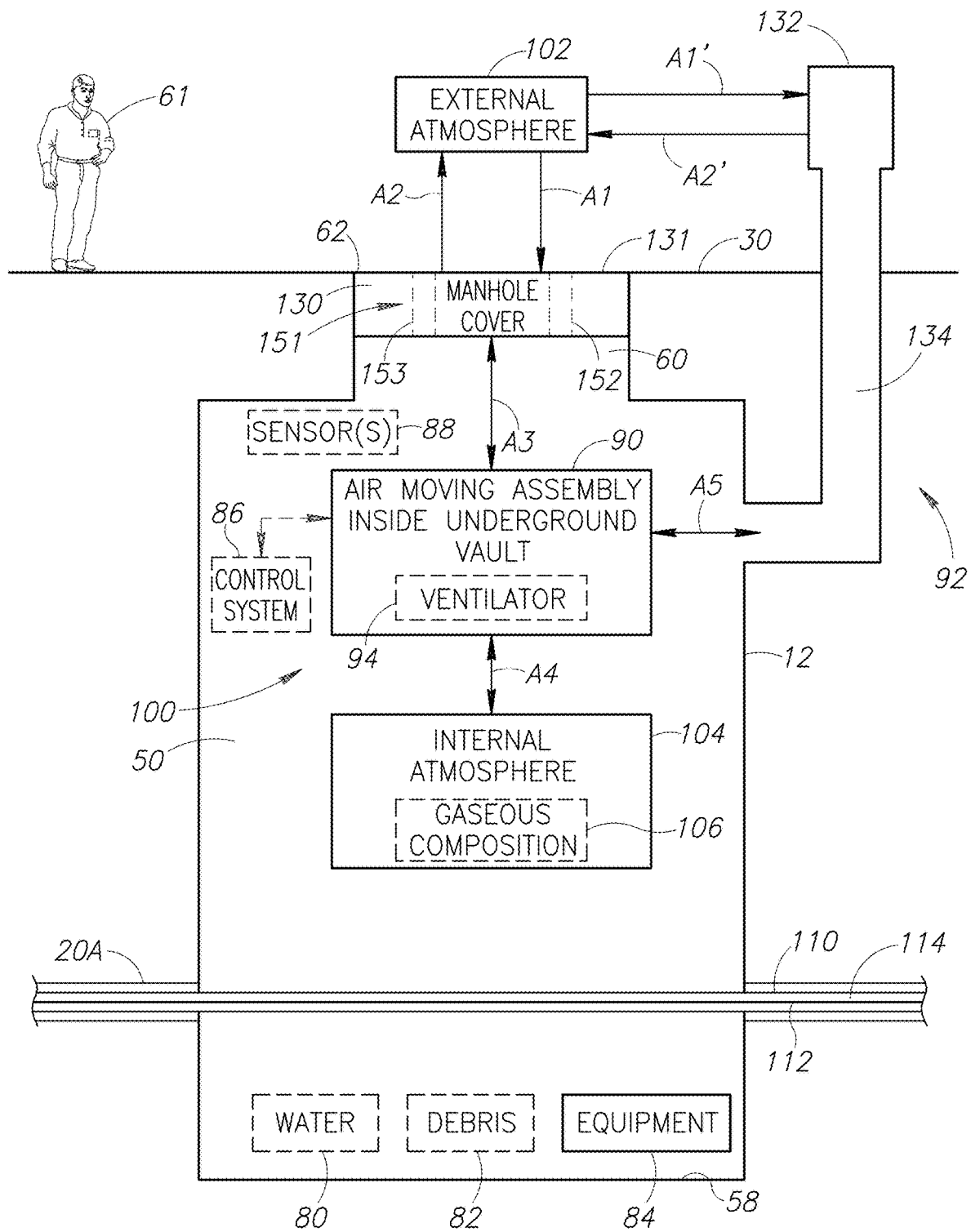
FIG. 1 is a block diagram of an exemplary manhole event suppression system.

Referring to FIG. 1, the manhole event suppression system 100 may be installed in one or more of the vaults (each like the vault 12) interconnected by one or more conduits 20A. By way of non-limiting examples, the manhole event suppression system 100 may be implemented in accordance with any of the ventilation systems described in U.S. patent application Ser. No. 15/084,321 filed on Mar. 29, 2016, and titled VENTILATION SYSTEM FOR MANHOLE VAULT.

As shown in FIG. 1, the vault 12 and the conduit(s) 20A are positioned below a street or sidewalk level (identified as a surface 30). In FIG. 1, only the one vault 12 and one conduit 20A have been illustrated. However, any number of vaults (each substantially similar to the vault 12) and any number of conduits (each substantially similar to the conduit 20A) may be included.

In the embodiment illustrated, the conduit 20A houses a cable 110 that has a conductor 112 surrounded by an outer layer 114 constructed from one or more cable insulation materials and/or cable shield materials. The vault 12 may house equipment 84 (e.g., electrical equipment). The vault 12 may also house undesirable materials, such as water 80 (e.g., flood water) and/or debris 82 (e.g., hazardous liquids, road salt, trash, human waste, vermin, hypodermic syringes, etc.).

The manhole event suppression system 100 includes an air moving assembly 90 and an interface 92 between an external atmosphere 102 (e.g., above the surface 30) outside the vault 12 and an internal atmosphere 104 inside the vault 12. The internal atmosphere 104 may include an undesired (and potentially dangerous) gaseous composition 106. The gaseous composition 106 may be non-uniformly distributed within the interior 50 of the vault 12. For example, the gaseous composition 106 may be adjacent or near the floor 58. Gases (that contribute to the gaseous composition 106) may result from electrochemical degradation of the outer layer 114 or a portion thereof (e.g., cable insulation). Further, electrical tracking may heat and decompose the outer layer 114 or a portion thereof (e.g., cable insulation) to create gases (that contribute to the gaseous composition 106).

All or a portion of the air moving assembly 90 may be positioned inside the internal atmosphere 104 of the vault 12. Optionally, the air moving assembly 90 may include an air-moving device 94 (e.g., a ventilator). However, this is not a requirement.

The air-moving device 94 may be controlled by a control system 86 that may be positioned inside or outside the vault 12. The control system 86 may be connected to the air-moving device 94 via a wired connection, a wireless connection, one or more optical communication cables, and the like. Fiber optics typically have non-conductive jackets/sheaths and may allow the control system 86 to be positioned above ground. However, this is not a requirement.

The control system 86 may receive (e.g., via a wired connection, a wireless connection, one or more optical communication cables, and the like) environmental data (e.g., a monitoring signal including at least one value of at least one parameter) from one or more sensors 88 inside the vault 12. For example, the sensor(s) 88 may be configured to monitor one or more gases inside the vault 12 and send that information to the control system 86 (e.g., in the monitoring signal). In such embodiments, the control system 86 may activate the air-moving device 94 when the sensor(s) 88 detect that at least a predetermined level of the monitored gas or gases are present inside the vault 12. The sensor(s) 88 may each be implemented as a smart sensor configured to activate the air-moving device 94 (e.g., on demand) when a concentration of combustible gases (e.g., hydrogen, carbon monoxide, methane, or other combustible gases) in the internal atmosphere 104 exceeds a predetermined first percentage (e.g., 50% or 75%) of a predetermined lower explosive limit ("LEL"). The sensor(s) 88 may be configured to run the air-moving device 94 until the concentration of combustible gases falls below a predetermined second percentage (e.g., 5% or 10%) of the predetermined LEL. Further, the manhole event suppression system 100 may be activated when a rate of change ("ROC") of one or more of the sensors 88 exceeds a predetermined threshold value.

The control system 86 may be configured to activate the air-moving device 94 using a timer. In this manner, the control system 86 may cycle the air-moving device 94 on and off at predetermined times (e.g., regular intervals, scheduled times, and the like). For example, the control system 86 may run the air-moving device 94 less than about 5 minutes every hour or less than about 15 minutes every hour.

By way of yet another non-limiting example, the control system 86 may include a limit switch that shuts power off to the air-moving device 94 when the manhole cover 130 is removed and/or the air-moving device 94 is removed.

By way of yet another non-limiting example, the sensor(s) 88 may be configured to monitor water level inside the vault 12. In such embodiments, the control system 86 may deactivate the air-moving device 94 when the sensor(s) 88 detects the water level inside the vault 12 exceeds a predetermined level.

By way of yet another non-limiting example, the control system 86 may be configured to monitor temperatures inside the vault 12. In such embodiments, the control system 86 may activate power to the air-moving device 94 when the temperature inside the vault 12 crosses a predetermined threshold value.

In some implementations, the control system 86 and/or the sensor(s) 88 may be subcomponents of the air moving assembly 90. Optionally, the control system 86 may be configured to control multiple air moving assemblies (each like the air moving assembly 90) installed in multiple vaults like the vault 12. Optionally, over-voltage protection may be provided for the air-moving device 94 and/or the control system 86.

The interface 92 may be implemented as a manhole cover 130 and/or a ventilation duct or vent stack 132. The vent stack 132 may be an existing external ventilation duct or vent stack (e.g., of the type currently in use in California).

In embodiments in which the interface 92 is the manhole cover 130, the manhole cover 130 includes one or more through-holes 151. A first portion of the through-holes 151 may each function as a vent hole 152 and/or a second portion of the through-holes 151 may each function as an exhaust hole 153. In other words, the manhole cover 130 may include one or more vent holes 152 and/or one or more exhaust holes 153. Each vent hole 152 is configured to allow a portion of the external atmosphere 102 (represented by an arrow A1) to pass through the manhole cover 130 and enter the internal atmosphere 104. On the other hand, each exhaust hole 153 is configured to allow a portion of the internal atmosphere 104 (represented by an arrow A2) to pass through the manhole cover 130 and enter the external atmosphere 102. As is apparent to those of ordinary skill in the art, because the direction of the flow through a particular one of the through-holes 151 determines whether that particular through-hole is a vent hole or an exhaust hole, any one of the through-holes 151 may be used as either a vent hole or an exhaust hole. Further, by reversing the direction of the flow, a vent hole may be converted into an exhaust hole and vice versa. Further, one or more of the through-holes 151 may be configured for bi-directional flow and therefore function as both a vent hole and an exhaust hole.

The vent hole(s) 152 and the exhaust hole(s) 153 may be sized so as to equalize pressure between the external and internal atmospheres 102 and 104. For example, the ratio of the total open area available for gas ingress (i.e., intake represented by the arrow A1) through the vent hole(s) 152 to that available for gas egress (i.e., exhaust represented by the arrow A2) through the exhaust hole 153 may be about 1.0±0.25. However, this is not a requirement. By way of another non-limiting example, the ratio of total open area available for gas ingress (i.e., intake represented by the arrow A1) through the vent hole(s) 152 to that available for gas egress (i.e., exhaust represented by the arrow A2) through the exhaust hole 153 may be adjusted (or restricted) such that air is preferentially drawn from adjacent manhole vaults instead of entirely from the vault 12, and exhausted through the exhaust hole(s) 153. In this manner, the air moving assembly 90 in the vault 12 may be used to also draw air from other vaults connected thereto.

The vent hole(s) 152 may occupy at least a predetermined amount of a total area of a top side 131 of the manhole cover 130. By way of non-limiting examples, the predetermined amount of the total area of the top side 131 occupied by the vent hole(s) 152 may be about 5% or about 15.

Similarly, the exhaust hole(s) 153 may occupy at least a predetermined amount of the total area of the top side 131 of the manhole cover 130. By way of non-limiting examples, the predetermined amount of the total area of the top side 131 occupied by the exhaust hole(s) 153 may be about 5% or about 15%.

In embodiments in which the interface 92 is the ventilation stack 132, the ventilation stack 132 provides a passageway 134 in fluid communication with both the external and internal atmospheres 102 and 104. Thus, a portion of the external atmosphere 102 (represented by an arrow A1') may pass through the passageway 134 and enter the internal atmosphere 104. On the other hand, a portion of the internal atmosphere 104 (represented by an arrow A2') may pass through the passageway 134 and enter the external atmosphere 102.

The arrows A1 and A1' represent exterior (fresh) air flowing from the external atmosphere 102 into the internal atmosphere 104. On the other hand, the arrows A2 and A2' represent interior (stale and/or contaminated) air flowing from the internal atmosphere 104 into the external atmosphere 102. Together, the arrows A1 and A2 represent an air exchange between the external and internal atmospheres 102 and 104 through the manhole cover 130, and the arrows A1' and A2' represent an air exchange between the external and internal atmospheres 102 and 104 through the ventilation stack 132.

The air moving assembly 90 causes the air exchange represented by one or more of the arrows A1, A1', A2, and A2'. In other words, in embodiments in which the interface 92 includes the manhole cover 130, the air moving assembly 90 may cause at least a portion of the internal atmosphere 104 (represented by the arrow A2) to be expelled outwardly from the vault 12 through the exhaust hole(s) 153 in the manhole cover 130, and/or at least a portion of the external atmosphere 102 (represented by the arrow A1) to be drawn into the vault 12 through the vent hole(s) 152 in the manhole cover 130. In embodiments in which the interface 92 includes the ventilation stack 132, the air moving assembly 90 may cause at least a portion of the internal atmosphere 104 (represented by the arrow A2') to be expelled outwardly from the vault 12 through the passageway 134 and/or at least a portion of the external atmosphere 102 (represented by the arrow A1') to be drawn into the vault 12 through the passageway 134. Optionally, the air-moving device 94 may be external to the vault. For example, the air-moving device 94 may be located within the vent stack 132.

In embodiments in which the interface 92 includes the manhole cover 130, double-headed arrows A3 and A4 represent airflow inside the vault 12 generated by the air moving assembly 90. In such embodiments, the air moving assembly 90 may be configured to push (e.g., blow) internal air toward the exhaust hole(s) 153 of the manhole cover 130, pull (e.g., blow) external air in through the vent hole(s) 152 of the manhole cover 130, or both. In embodiments in which the interface 92 includes the ventilation stack 132, double-headed arrows A4 and A5 represent airflow inside the vault 12 generated by the air moving assembly 90. In such embodiments, the air moving assembly 90 may be configured to push (e.g., blow) internal air into the passageway 134 of the ventilation stack 132, pull (e.g., blow) external air in through the passageway 134 of the ventilation stack 132, or both.

The conduit 20A interconnecting the vaults (each like the vault 12) provides a passageway through which air (and other gases) may travel between the vaults. The air moving assembly 90 may cause air (and other gases) to flow into the internal atmosphere 104 from one or more conduits (each like the conduit 20A) and/or one or more of the neighboring vaults (via the conduits). Additionally, the air moving assembly 90 may cause air (and other gases) to flow out of the internal atmosphere 104 into one or more of the conduits (each like the conduit 20A) and potentially into one or more neighboring vaults (via the conduits). In other words, the air moving assembly 90 may move air between a particular vault (e.g., the vault 12) and one or more of the conduits (each like the conduit 20A). Further, the air moving assembly 90 may move air between a particular vault (e.g., the vault 12) and one or more neighboring vaults via the conduits.

First Embodiment of a Data Logger

Figure 2:
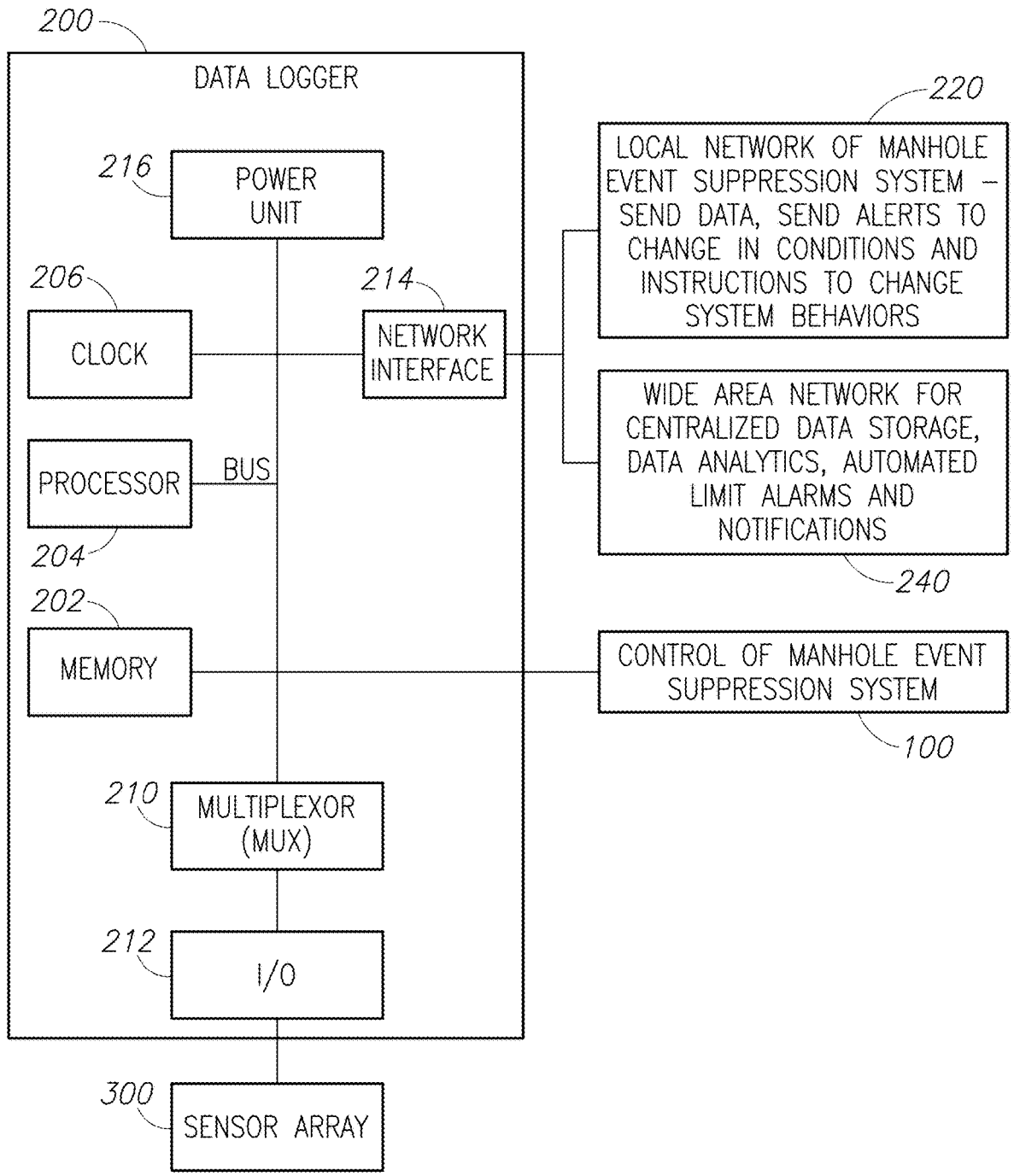
FIG. 2 is a block diagram of a first exemplary implementation of a data logger that may be used to control one or more manhole event suppression systems.

FIG. 2 is a block diagram of a first exemplary implementation of a data logger 200 that may be used to control one or more manhole event suppression systems. The manhole event suppression system(s) controlled by the data logger 200 may include one or more manhole event suppression systems each like the manhole event suppression system 100. For ease of illustration, in FIG. 2, the data logger 200 is illustrated controlling the manhole event suppression system 100. In such embodiments, the control system 86 (see FIG. 1) may be implemented using the data logger 200 and the one or more sensors 88 (see FIG. 1) may be implemented as a sensor array 300. However, this is not requirement. By way of yet another example, the data logger 200 may control one or more manhole event suppression systems unlike the manhole event suppression system 100. For example, while the manhole event suppression system 100 works on the principle of preventing the build up of a combustible gases inside the vault 12 (see FIG. 1), the data logger 200 may control one or more manhole event suppression systems that work on the principle of preventing sources of ignition or limiting the concentration of oxidizers (such as oxygen) within the vault 12. By way of yet another example, the data logger 200 may be integrated or housed in the ventilator, cover, or ducting of the manhole event suppression system 100.

Referring to FIG. 2, the data logger 200 may include the follow components:

A memory 202 configured to store data temporarily during processing and/or to store data long-term. The memory 202 may consist of multiple types of memory (volatile and non-volatile memory, etc.).

A processor 204 configured to receive, process, and store data in the memory 202

A clock 206 used by the processor 204 to time stamp data. The clock 206 may serve as an alarm that transitions the data logger 200 from a "sleep mode" to a "collect data mode."

An optional multiplexor (MUX) 210 configured to combine data from a sensor array 300 (described below) into a single output for the processor 204.

An I/O 212 configured to provide an interface between the processor 204 and the sensor array 300.

A network interface 214 configured to provide communication between the data logger 200 and a local area network 220 and/or a wide area network 240.

A power unit 216 configured to provides power necessary to run the data logger 200, the sensor array 300, and the networking interface 214. The power unit 216 also provides power to control the air-moving device 94 (see FIG. 1) of the manhole event suppression system 100. The power unit 216 may receive power from a service voltage (e.g., the conductor 112 illustrated in FIG. 1), a battery, a parasitic power source, or an external power source.

The above components of the data logger 200 are interconnected by a bus 250 that may be any of several types of bus structures including a memory bus or memory controller, a peripheral bus, and a local bus using any of a variety of bus architectures.

The data logger 200 is configured to control the manhole event suppression system 100. For example, the data logger 200 may be configured to turn the system 100 (e.g., the air-moving device 94 depicted in FIG. 1) on and off. The data logger 200 may be configured to adjust the performance of the system 100 to meet the conditions based on data measured by the sensor array 300. The data logger 200 may be configured to instruct the system 100 to execute a pre-programmed time routine. By way of another non-limiting example, the data logger 200 may receive one or more external triggers or commands from the network interface 214 and instruct the system 100 based on those commands.

As mentioned above, the network interface 214 is configured to provide communication between the data logger 200 and the local area network 220 and/or the wide area network 240. As used herein, the local area network 220 is a network of manhole event suppression systems (e.g., like the system 100). The data logger 200 may be connected to neighboring data loggers or manhole event suppression systems through either a direct connection or communication protocols such as SCADA, IEC 61850, IEEE 802.11, IEEE 802.16, Bluetooth, networks, wireless networks, cellular networks, satellite networks, Internet, etc. The local area network 220 allows each manhole event suppression system to adjust to events and measurements occurring in adjacent or neighboring manholes and optimize its performance. The network interface 214 may be configured to receive commands from the local area network 220 and/or the wide area network 240 and operate the manhole event suppression system 100 based on the commands received.

As used herein, the wide area network 240 may include a centralized computing system (not shown) configured to provide centralized data storage, data analytics, automated limit alarms, and/or notifications. The data logger 200 may be connected to the wide area network 240 through communication protocols such as SCADA, IEC 61850, IEEE 802.11, IEEE 802.16, Bluetooth, networks, wireless networks, cellular networks, satellite networks, Internet, etc. Data collected by the wide area network 240 may be used to identify out of limit data, raise alarms (or flags) indicating a possible or imminent problem, and/or initiate investigatory work to prevent a catastrophic failure. The data collected by the distributed wide area network 240 may be stored and analyzed to increase the understanding of manhole events. For example, the data may be used to identify the triggers leading to manhole events and the precursors to manhole events. Further, the data may be used to determine how to optimize the performance of the system 100 and other systems connected to the wide area network 240. Special instructions can be communicated back to the centralized computing system (not shown) to optimize performance and/or change the behavior of the manhole event suppression systems connected to the wide area network 240.

Figure 3:
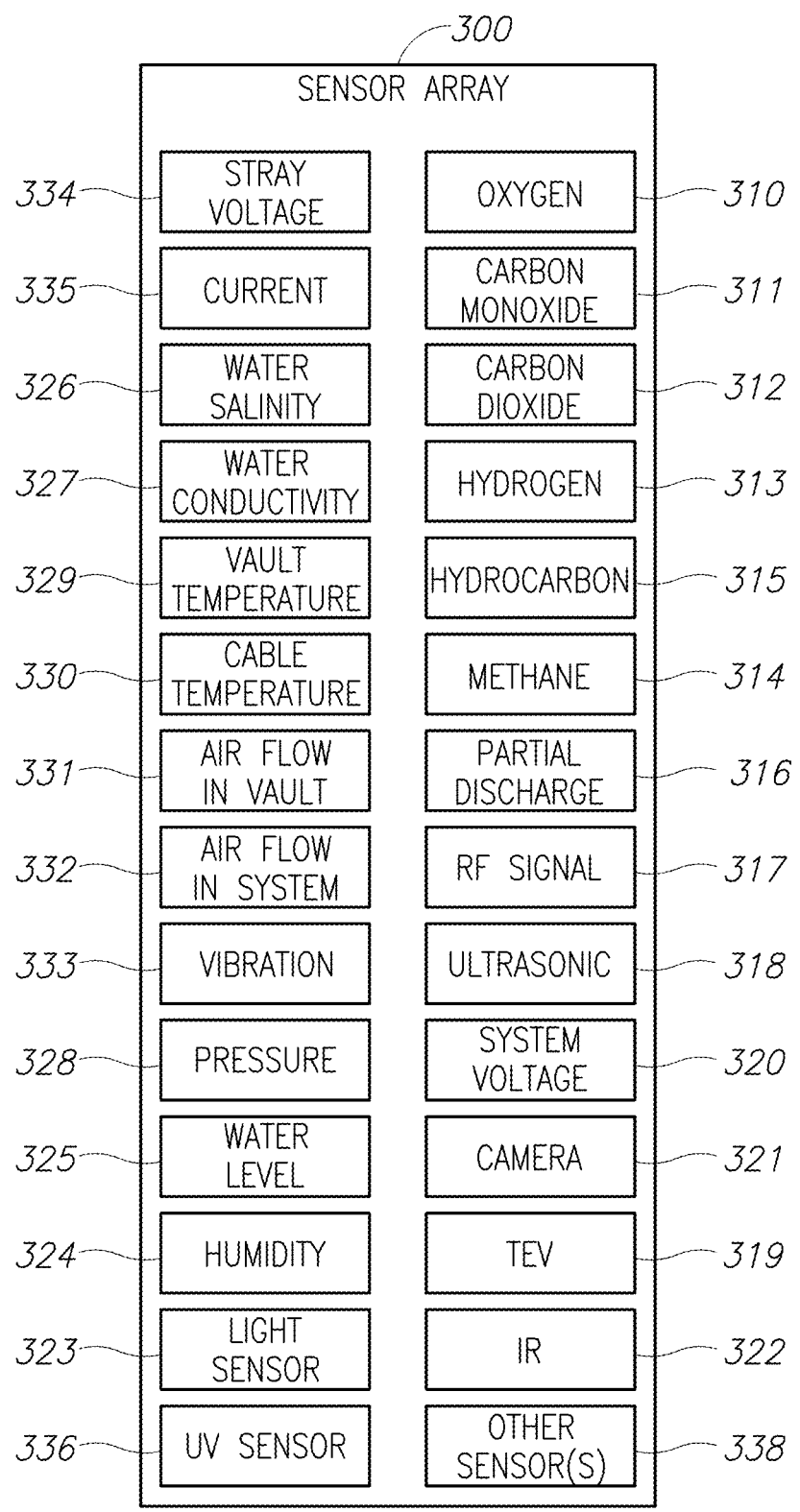
FIG. 3 is a block diagram of a sensor array of the data logger of FIG. 2.

FIG. 3 is a block diagram of the sensor array 300, which may include one of more of the follow sensors each connected to the data logger 200 by the I/O 212:

An oxygen sensor 310 configured to measure a concentration of oxygen contained in the vault 12 (e.g., as a total percentage, a percentage of the lower explosive limit (LEL), a rate of change (ROC), etc.).

A carbon monoxide sensor 311 configured to measure a concentration of carbon monoxide contained in the vault 12 (e.g., as a total percentage, a percentage of the LEL, a ROC, etc.).

A carbon dioxide sensor 312 configured to measure a concentration of carbon dioxide contained in the vault 12 (e.g., as a total percentage, a percentage of the LEL, a ROC, etc.).

A hydrogen sensor 313 configured to measure a concentration of hydrogen contained in the vault 12 (e.g., as a total percentage, a percentage of the LEL, a ROC, etc.).

A methane sensor 314 configured to measure a concentration of methane contained in the vault 12 (e.g., as a total percentage, a percentage of the LEL, etc.).

A hydrocarbon sensor 315 configured to measure a concentration of hydrocarbon gasses (e.g., propane, octane, etc.) contained in the vault 12 (e.g., as a total percentage, a percentage of the LEL, a ROC, etc.).

A partial discharge sensor 316 configured to monitor and measures partial discharge activity that occurs in the vault 12 and neighboring electrical network using capacitive or inductive sensors.

A radio frequency ("RF") signal sensor 317 configured to monitor RF spectrum (~1 MHz-1 GHz) for an electrical discharge or partial discharge activity occurring near the point of detection An ultrasonic sensor 318 configured to monitor the ultrasonic spectrum (~20 kHz-1 MHz) for an electrical discharge or partial discharge activity occurring near the point of detection A Transient Earth Voltage (TEV) sensor 319 configured to monitor for an electrical discharge or partial discharge transients A system voltage sensor 320 configured to monitor cable systems (e.g., the cable 110) running through the vault 12 for voltage spikes and voltage transients A camera 321 configured to be activated based on an event or trigger to photograph or capture video of the vault 12, electrical system, or the manhole event suppression system 100. By way of non-limiting examples, the camera 321 may be configured to capture high-speed video, high definition video, and the like.

An infrared ("IR") sensor 322 configured to detect relative temperature differences of equipment and system components contained within the manhole vault 12

A ultraviolet ("UV") sensor 336 configured to detect the light emitted in the ultraviolet spectrum from corona discharge that occurs within the vault 12, electrical system, etc.

A light sensor 323 configured to detect changes in ambient light conditions.

A humidity sensor 324 configured to measure the relative humidity of the internal atmosphere 104 (see FIG. 1).

A water level sensor 325 configured to measure the water level contained with the vault 12

A salinity of water sensor 326 configured to measures the salinity of the water contained with the vault 12

A conductivity of water sensor 327 configured to measure the conductivity of water contained with the vault 12

A pressure sensor 328 configured to measure the atmospheric pressure contained within the vault 12

A vault temperature sensor 329 configured to measure the ambient temperature within the vault 12

A cable temperature sensor 330 configured to measure the temperature of cables (e.g., the cable 110) that pass through the vault 12

A vault/conduit air flow sensor 331 configured to measure the airflow at one or multiple locations within the vault 12 and/or the conduit 20A A suppression system air flow sensor 332 configured to measure the airflow at one or multiple locations within the manhole event suppression system 100.

A vibration sensor 333 configured to measure the vibration and motion of the environment inside the vault 12.

A stray voltage sensor 334 configured to measure stray voltage within the vault 12 and the cable system (e.g., the cable 110) between two or more grounding points.

A current sensor 335 configured to measure current travelling on cables (e.g., the cable 110) and ground wires within the vault 12.

One or more other sensors 338.

By way of non-limiting examples, the other sensor(s) 338 may include one or more of the following:

A duct airflow sensor that is configured to determine airflow through the conduits 20A. The duct airflow sensor may be substantially similar to the vault/conduit air flow sensor 331.

A radon sensor configured to detect a level of radon in the vault 12. For example, the radon sensor may measure a concentration of radon contained in the vault 12 (e.g., as a total percentage, a ROC, etc.).

A hydrogen-sulfide sensor configured to measure a concentration of hydrogen-sulfide contained in the vault 12 (e.g., as a total percentage, a ROC, etc.).

A particulates/opacity sensor configured to measure a concentration of particulates in the internal atmosphere 104 (see FIG. 1) inside the vault 12.

A global positioning system ("GPS") configured to determine where the data logger 200 is located.

An accelerometer configured to determine when a manhole event occurs or when the data logger 200 is moved during maintenance.

A motion sensor configured to determine when a manhole event occurs.

A magnetic field sensor configured to monitor changes or fluctuations in the magnetic field.

Second Embodiment of a Data Logger

Figure 4:
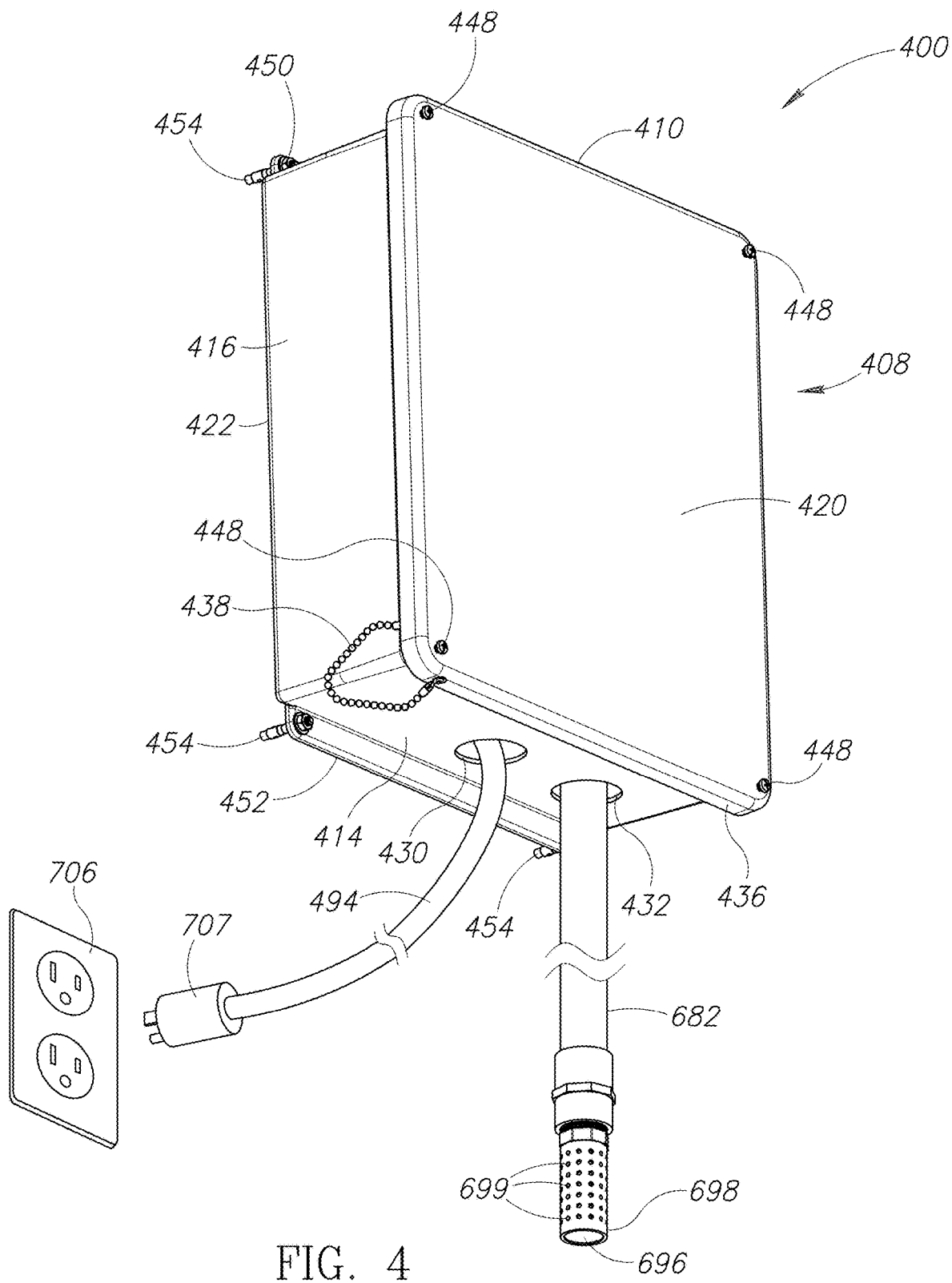
FIG. 4 is a bottom perspective view of a second exemplary implementation of a data logger that may be used to control one or more manhole event suppression systems.
Figure 13:
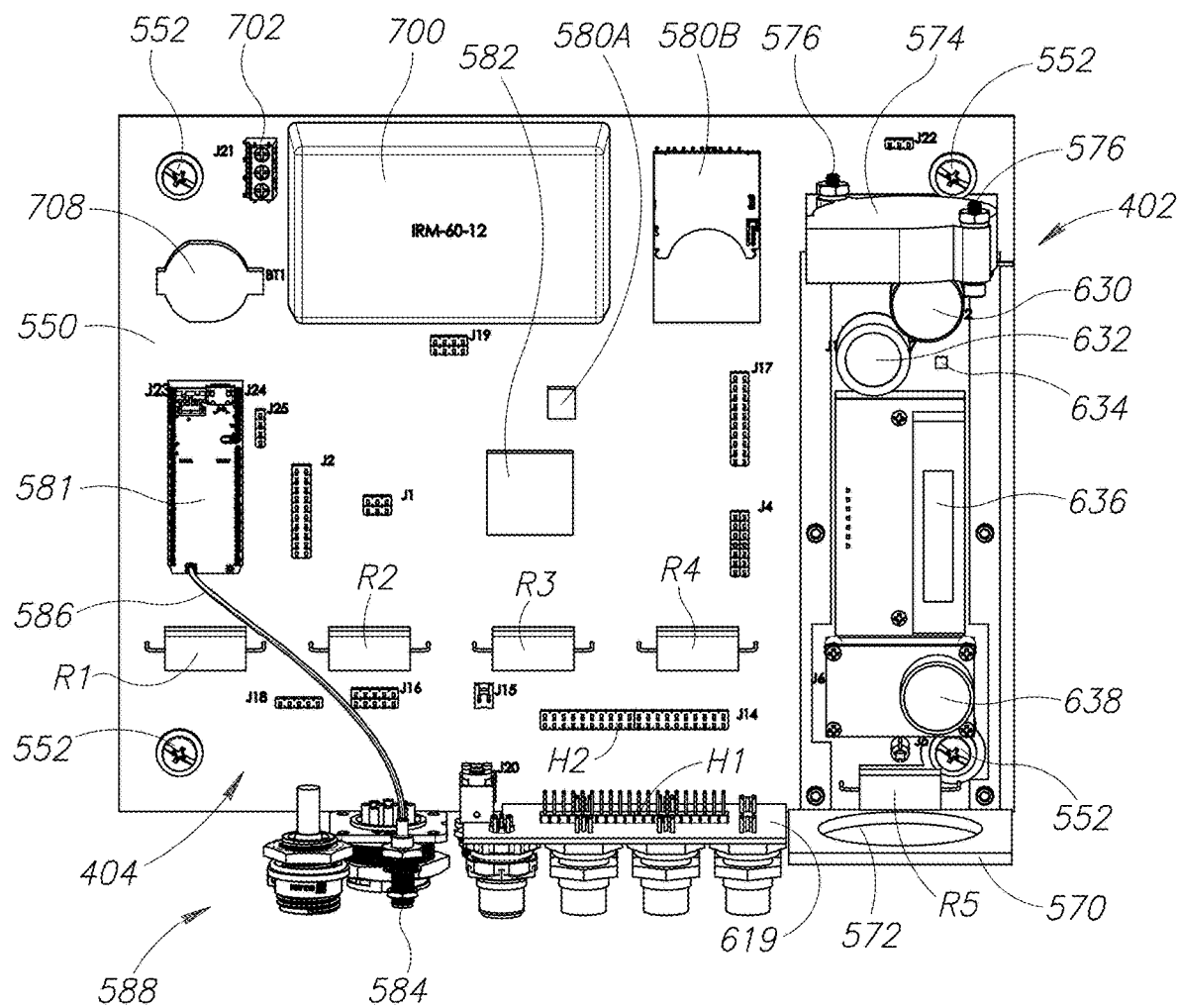
FIG. 13 is a top perspective view of the electrical components mounted on the substrate of the data logger of FIG. 4 omitting the enclosure.
Figure 14:
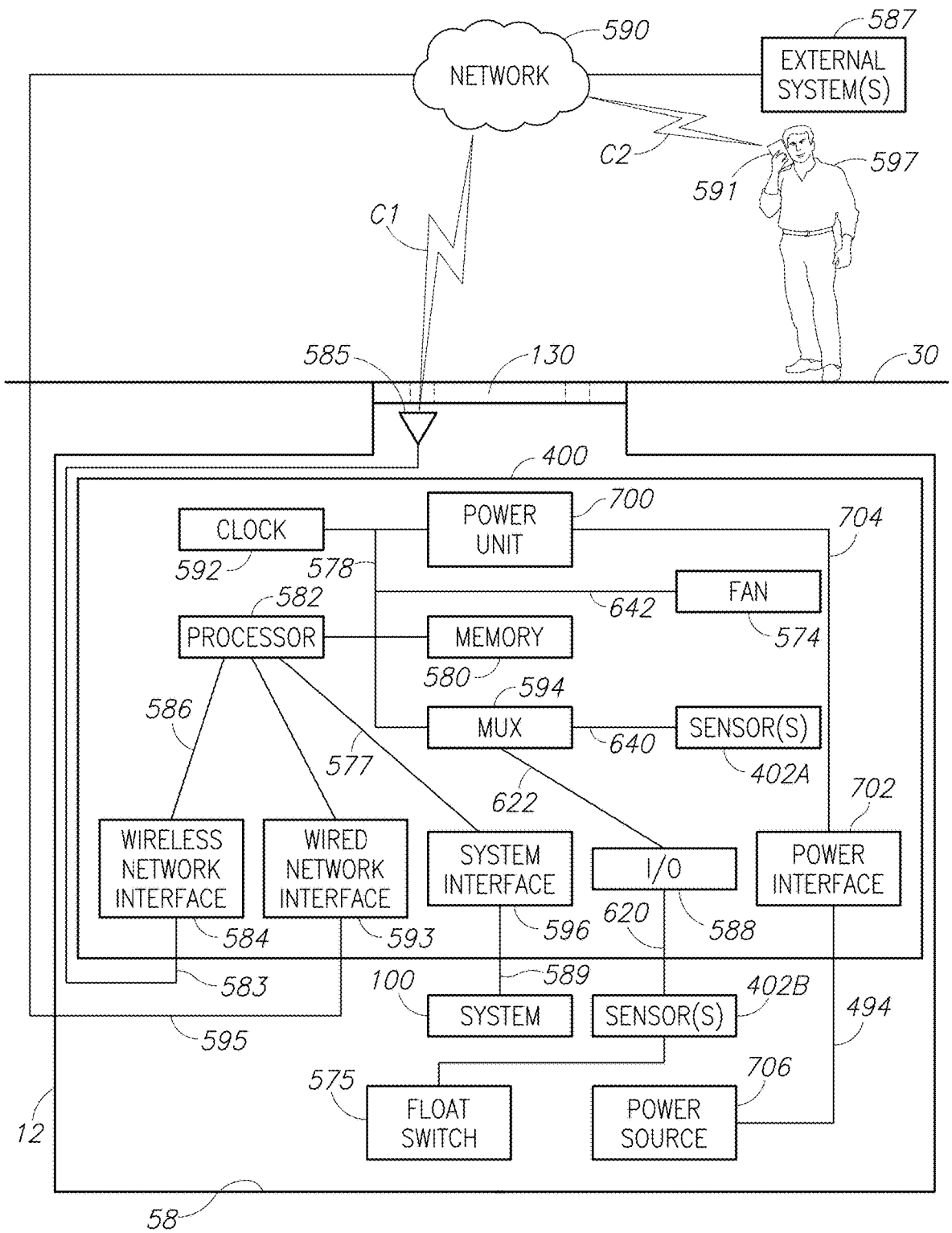
FIG. 14 is a block diagram illustrating some of the electrical components of the data logger of FIG. 4.

FIG. 4 is a block diagram of a second exemplary implementation of a data logger 400 that may be used to monitor conditions inside the vault 12 (see FIGS. 1 and 14) control one or more manhole event suppression systems. The data logger 400 may be used in place and instead of the data logger 200. For example, the data logger 400 may be used to control one or more manhole event suppression systems each like the manhole event suppression system 100 (see FIGS. 1 and 2). In such embodiments, the control system 86 (see FIG. 1) may be implemented using the data logger 400 and the one or more sensors 88 (see FIG. 1) may be implemented as one or more sensors 402 (see FIGS. 13 and 15). However, this is not requirement. Referring to FIG. 14, the sensor(s) 402 (see FIGS. 13 and 15) may include one or more internal sensors 402A located inside the data logger 400 and one or more external sensors 402B located outside the data logger 400 (e.g., inside the vault 12).

Referring to FIG. 14, the data logger 400 may be installed inside the vault 12. The data logger 400 may be configured to communicate with and control external devices, such as electrical system equipment. The data logger 400 may be connected to and control a first system (e.g., the manhole event suppression system 100) installed in the vault 12. Optionally, the data logger 400 may be connected to and control a second system (e.g., like the manhole event suppression system 100) installed in another vault (e.g., like the vault 12). In such embodiments, the data logger 400 may be connected to the second system (not shown) via one or more of the conduit(s) 20A (see FIG. 1) that interconnect the first and second vaults. Optionally, the data logger 400 may be connected to and control any number of systems (e.g., each like the manhole event suppression system 100) installed in any number of vaults (e.g., each like the vault 12) and interconnected by the conduit(s) 20A (see FIG. 1).

The system(s) controlled by the data logger 400 may ventilate the vault(s) and/or circulate air within the vault(s). Further, the data logger 400 may control one or more manhole event suppression systems unlike the manhole event suppression system 100 (see FIGS. 1 and 2). For example, referring to FIG. 1, while the manhole event suppression system 100 works on the principle of preventing the buildup of a combustible gases inside the vault 12, the data logger 400 (see FIGS. 4, 5, and 14) may control one or more manhole event suppression systems that work on the principle of preventing sources of ignition or limiting the concentration of oxidizers (such as oxygen) within the vault 12.

Referring to FIG. 4, the data logger 400 is not limited to use with a manhole event suppression system. Instead, the data logger 400 may be used in other types of confined spaces. For example, the data logger 400 may be used to detect the presence of water and/or a level of the water within a vault at a nuclear power plant. By way of another non-limiting example, the data logger 400 may be installed in underground vaults along with new or existing utility (e.g., electrical) meters.

As will be described below, the data logger 400 is configured to operate in an environment prone to flooding (e.g., underground cavities). The data logger 400 houses electrical components 404 (see FIGS. 9-11 and 13), like the sensor(s) 402 (see FIGS. 13 and 15). Thus, the data logger 400 is configured to prevent the water 80 (see FIG. 1) from contacting the electrical components 404 (see FIGS. 9-11 and 13). Additionally, as will be described below, the data logger 400 is configured to be installed permanently (e.g., about 15 years or longer) and to receive power from inside the vault 12. Optionally, the electrical components 404 (see FIGS. 9-11 and 13) may include a source of backup power.

Referring to FIG. 4, the data logger 400 includes a housing assembly 408. In the embodiment illustrated, the housing assembly 408 includes an outer housing 410. In the embodiment illustrated, the outer housing 410 has a generally square or rectangular outer shape with an upper portion 412 (see FIG. 5) opposite a lower portion 414. The outer housing 410 also has a first side portion 416 opposite a second side portion 418 (see FIG. 5) and a front portion 420 opposite a back portion 422.

Figure 5:
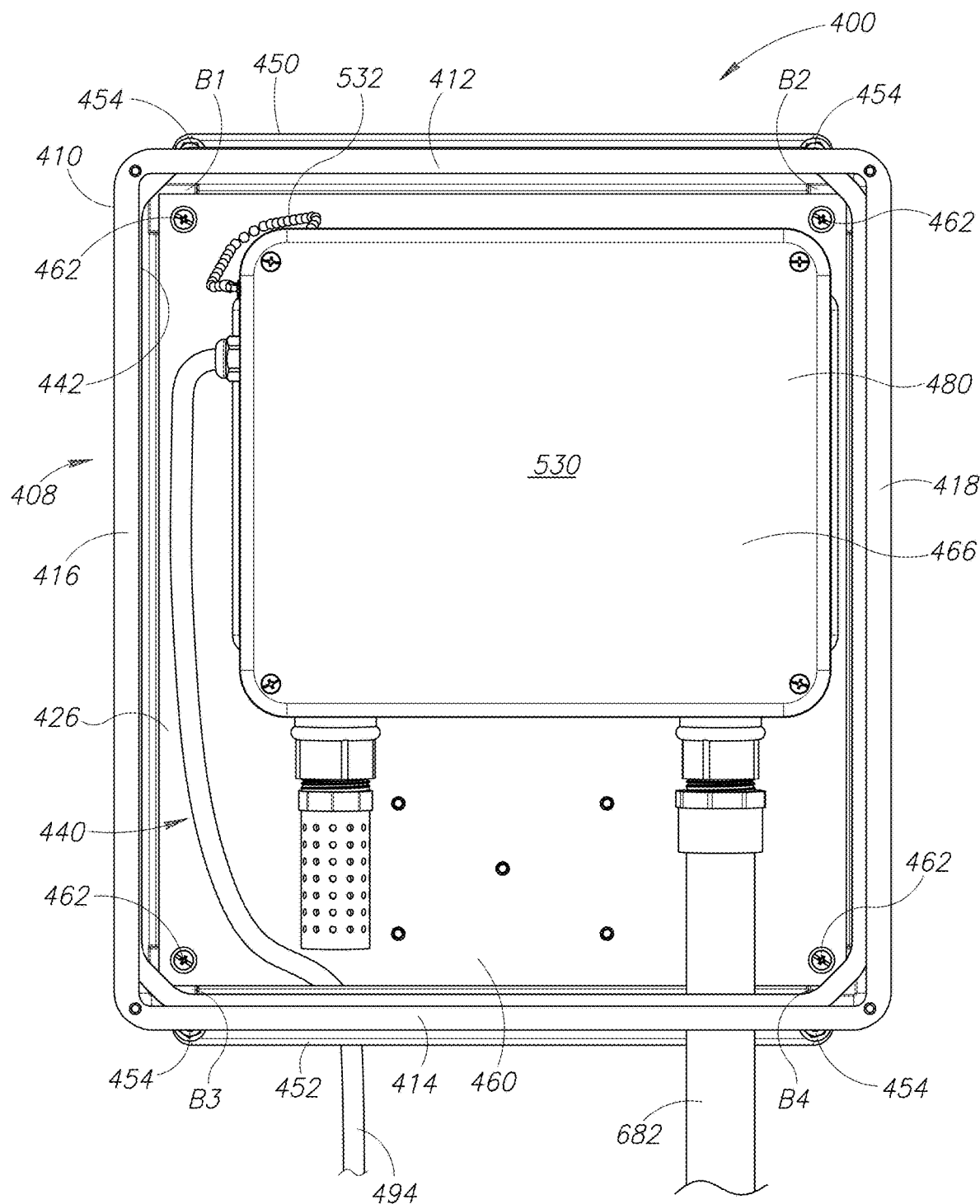
FIG. 5 is a front elevational view of the data logger of FIG. 4 illustrated with its front cover removed.

Referring to FIG. 5, the outer housing 410 is configured to trap air inside its interior 426. Thus, the outer housing 410 does not include any openings along its upper portion 412 or its first and second side portions 416 and 418. However, referring to FIG. 4, the lower portion 414 of the outer housing 410 includes one or more apertures 430 and 432 that each provides a throughway into the interior 426 (see FIG. 5). Thus, referring to FIG. 14, the outer housing 410 (see FIGS. 4 and 5) may be characterized as being like a diving bell that traps air and prevents the sensor(s) 402A and electrical components 404 (see FIGS. 9-11 and 13) located inside the data logger 400 from being submerged when the water 80 (see FIG. 1) infiltrates the vault 12. This helps prolong the life span of the sensor(s) 402A and the electrical components 404 (see FIGS. 9-11 and 13). The outer housing assembly 410 may be sized to trap air and protect the sensor(s) 402A and the electrical components 404 at an internal pressure of up to 2 atmospheres (or in about 30 feet of water).

Referring to FIG. 4, in the embodiment illustrated, the front portion 420 of the outer housing 410 includes a removable cover plate 436. Optionally, a tether 438 may attach the cover plate 436 to the remainder of the outer housing 410 when the cover plate 436 (see FIG. 4) is removed from the remainder of the outer housing 410. The tether 438 may help prevent the cover plate 436 from being lost or damaged. Referring to FIG. 5, when the cover plate 436 (see FIG. 4) is removed, internal components 440 may be installed and/or accessed in the interior 426 of the outer housing 410 through a front opening 442 defined by the upper, lower, first side, and second side portion 412-418. The cover plate 436 (see FIG. 4) may be attached to the upper, lower, first side, and second side portions 412-418 of the outer housing 410 by one or more fasteners 448 (see FIG. 4). Referring to FIG. 4, the fastener(s) 448 may each be implemented as a screw, a bolt, and the like. In the embodiment illustrated in FIG. 5, the fasteners 448 (see FIG. 4) are inserted at or near intersections of the upper and lower portions 412 and 414 with the first and second side portions 416 and 418. However, this is not a requirement.

In alternate embodiments, referring to FIG. 4, the front portion 420 of the outer housing 410 may omit the cover plate 436 and the front opening 442 (see FIG. 5). Instead, the lower portion 414 may include a similar removable bottom plate (not shown). Referring to FIG. 5, when the bottom plate (not shown) is removed, the internal components 440 may be installed in the interior 426 of the outer housing 410 through a bottom opening (not shown). Referring to FIG. 4, in such embodiments, the aperture(s) 430 and 432 may be formed in the bottom plate (not shown).

Referring to FIG. 4, the back portion 422 of the outer housing 410 includes an upwardly extending mounting flange 450 that extends upwardly from the upper portion 412 (see FIG. 5) and a downwardly extending mounting flange 452 that extends downwardly from the lower portion 414. The flanges 450 and 452 may be mirror images of one another. Fasteners 454 (e.g., screws, bolts, and the like) may be inserted into the flanges 450 and 452 and used to fasten the outer housing 410 to another structure (e.g., a wall of the vault 12 illustrated in FIG. 1).

Referring to FIG. 5, in the embodiment illustrated, the housing assembly 408 includes a plate 460. The internal components 440 of the data logger 400 are mounted on the plate 460 that is attached to the back portion 422 (see FIG. 4) of the outer housing 410 (e.g., by fasteners 462). In the embodiment illustrated, the outer housing 410 includes blocks B1-B4 at the locations whereat the fasteners 462 are used to attach the plate 460 to the back portion 422 (see FIG. 4).

Figure 6:
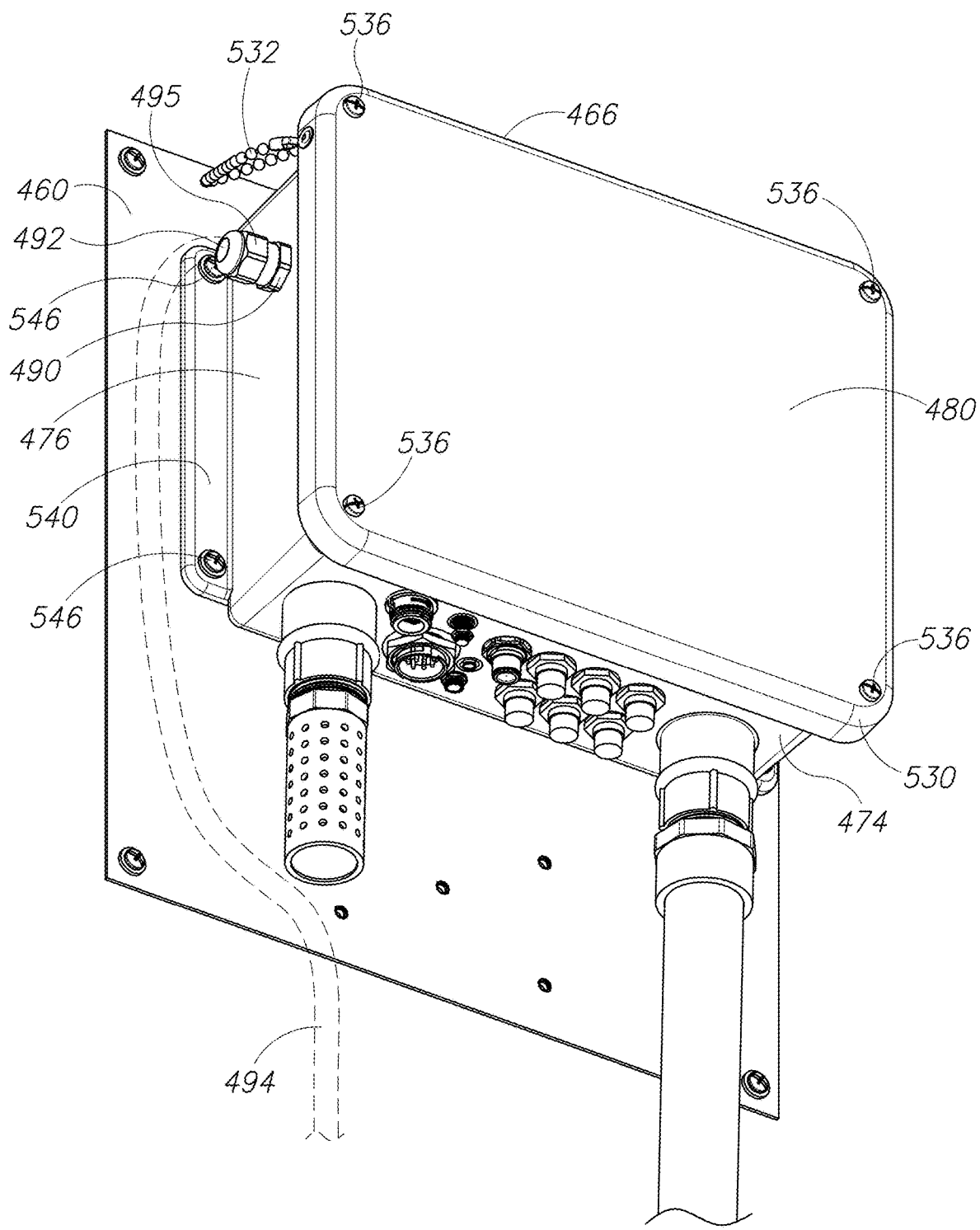
FIG. 6 is a bottom perspective view of the data logger of FIG. 4 omitting its outer housing.

The housing assembly 408 includes an internal housing 466 positioned inside the outer housing 410. Thus, the internal housing 466 may be characterized as being one of the internal components 440. The internal housing 466 houses the electrical components 404 (see FIGS. 9-11 and 13). In the embodiment illustrated, the internal housing 466 has a generally square or rectangular outer shape with an upper portion 472 (see FIG. 7) opposite a lower portion 474 (see FIG. 6). Referring to FIG. 6, the internal housing 466 also has a first side portion 476 opposite a second side portion 478 (see FIG. 7) and a front portion 480 opposite a back portion 482 (see FIG. 8).

Figure 8:
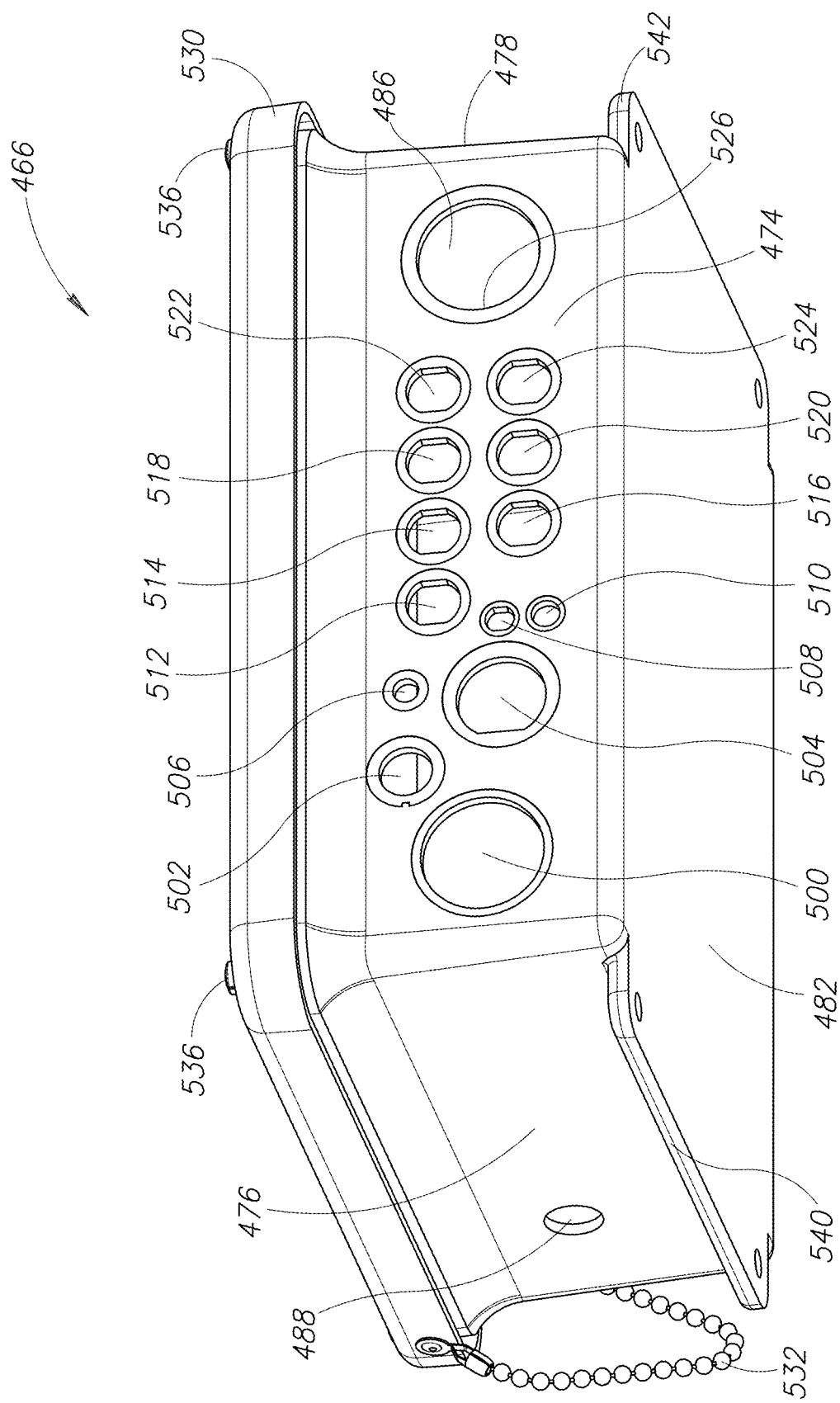
FIG. 8 is a bottom perspective view of an internal housing of the data logger of FIG. 4.
Figure 9:
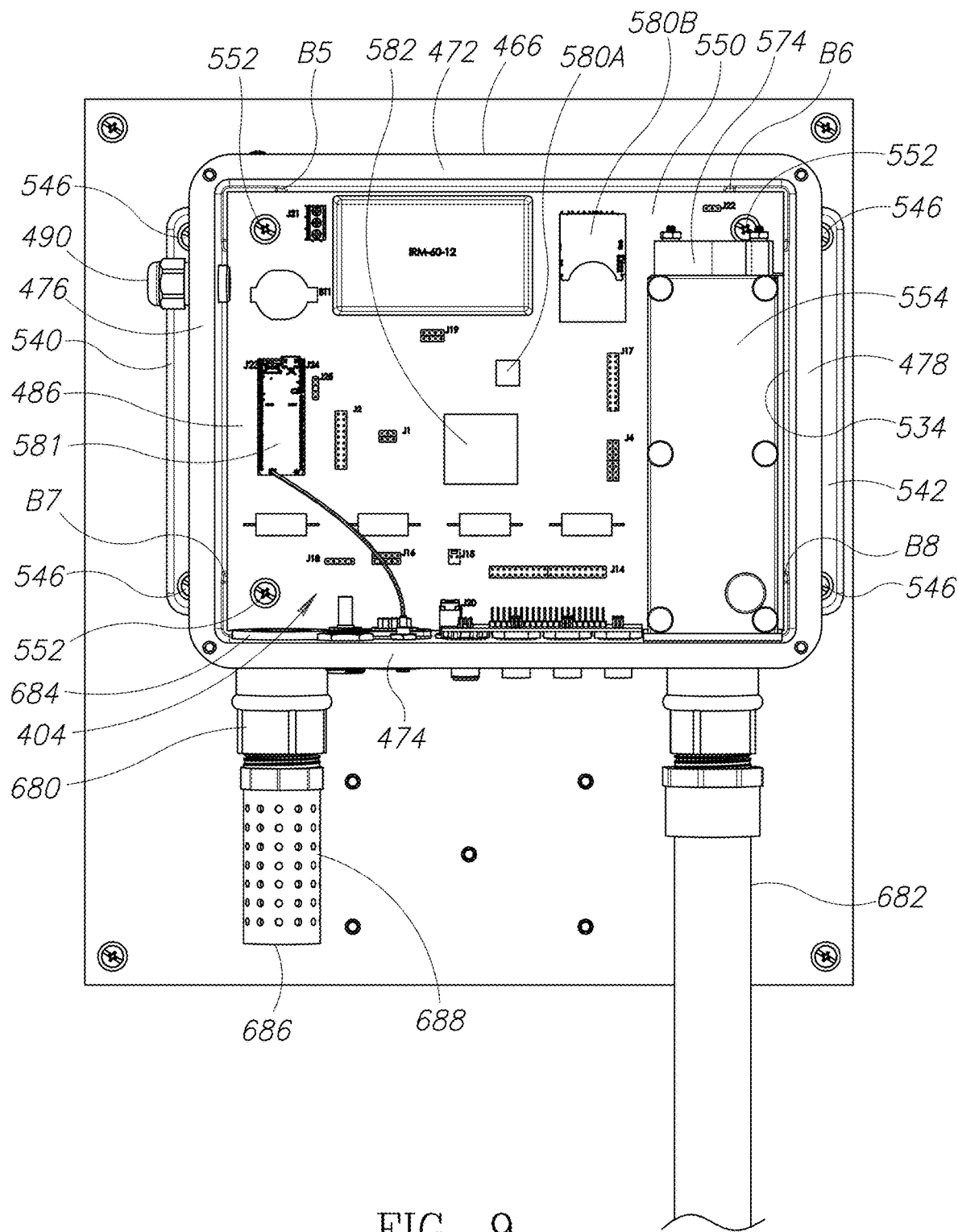
FIG. 9 is a front elevational view of the data logger of FIG. 4 omitting its power cable, the outer housing, and a front cover of the internal housing.

Referring to FIG. 9, the internal housing 466 is configured to trap air inside its interior 486. Thus, the internal housing 466 does not include any openings along its upper portion 472 or its second side portion 478. In the embodiment illustrated, the first side portion 476 includes an opening 488 (see FIG. 8) through which a cable grip 490 extends. Referring to FIG. 6, the cable grip 490 has a through-channel 492 through which a power cable 494 (shown in dashed lines) may extend into the internal housing 466. In the embodiment illustrated, the cable grip 490 includes a nut 495 that may be to tightened to increase the grip on the power cable 494. An internal O-ring or gasket (not shown) may be positioned inside the through-channel 492 and configured to squeeze the power cable 494 when the nut 495 is tightened. However, in alternate embodiments, the first side portion 476 does not include any openings and the cable grip 490 extends through the lower portion 474 instead of the first side portion 476. Referring to FIG. 8, the internal housing 466 includes one or more apertures 500-526 formed in its lower portion 474 that each provide a throughway into the interior 486.

Referring to FIG. 14, the internal housing 466 (see FIGS. 5-10) may be characterized as being like a diving bell that traps air and prevents the sensor(s) 402A and the electrical components 404 (see FIGS. 9-11 and 13) inside the interior 486 (see FIG. 9) from being submerged when the water 80 (see FIG. 1) infiltrates the vault 12. This improves the life span of the sensor(s) 402A and the components 404 (see FIGS. 9-11 and 13) inside the interior 486 (see FIG. 9).

Figure 7:
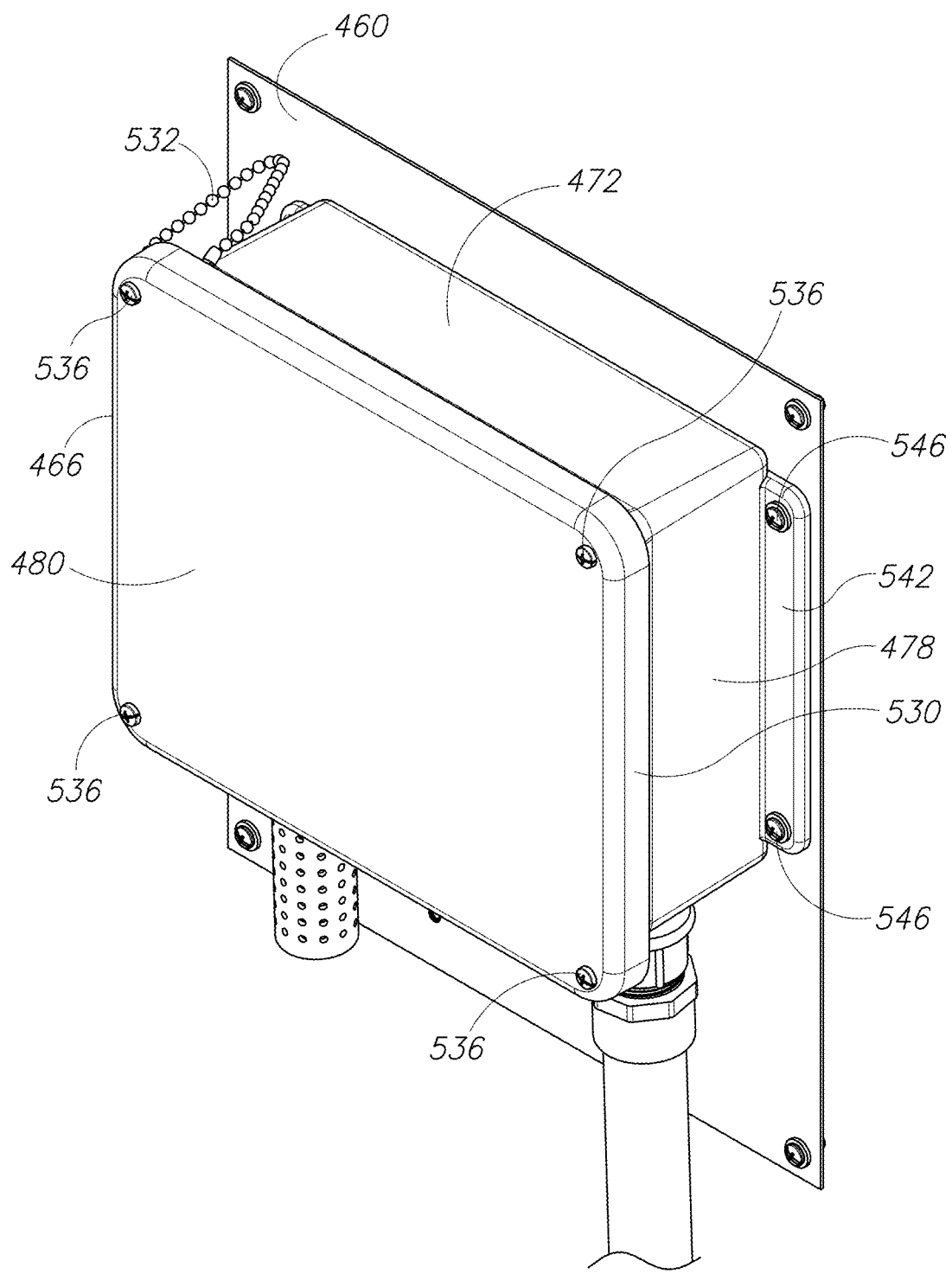
FIG. 7 is a top perspective view of the data logger of FIG. 4 omitting its outer housing.

Referring to FIG. 6, in the embodiment illustrated, the front portion 480 of the internal housing 466 includes a removable cover plate 530. Optionally, a tether 532 may attach the cover plate 530 to the remainder of the internal housing 466 when the cover plate 530 is removed from remainder of the internal housing 466. The tether 532 may help prevent the cover plate 530 from being lost or damaged. Referring to FIG. 9, when the cover plate 530 (see FIGS. 5-8) is removed, the electrical components 404 may be installed or accessed in the interior 486 of the internal housing 466 through a front opening 534 defined by the upper, lower, first side, and second side portions 472-478 of the internal housing 466. Referring to FIGS. 6 and 7, the cover plate 530 may be attached to the upper, lower, first side, and second side portions 472-478 of the internal housing 466 by one or more fasteners 536 (e.g., screws, bolts, and the like). Referring to FIG. 9, in the embodiment illustrated, the fasteners 536 (see FIGS. 6-8) are inserted at or near intersections of the upper and lower portions 472 and 474 with the first and second side portions 476 and 478. However, this is not a requirement.

In alternate embodiments, referring to FIG. 6, the front portion 480 of the internal housing 466 may omit the cover plate 530 and the front opening 534 (see FIG. 9). Instead, the lower portion 474 may include a removable bottom plate (not shown) similar to the cover plate 530. Referring to FIG. 9, when the bottom plate (not shown) is removed, the electrical components 404 may be installed and/or accessed in the interior 486 of the internal housing 466 through a bottom opening (not shown). In such embodiments, the aperture(s) 500-526 (see FIG. 8) may be formed in the bottom plate (not shown).

Referring to FIG. 8, the back portion 482 of the internal housing 466 includes a first mounting flange 540 that extends outwardly from the first side portion 476 and a second mounting flange 542 that extends outwardly from the second side portion 478. The flanges 540 and 542 may be mirror images of one another. Referring to FIGS. 6 and 7, fasteners 546 (e.g., screws, bolts, and the like) may be inserted into the flanges 540 and 542 and used to fasten the internal housing 466 to the plate 460.

Figure 16:
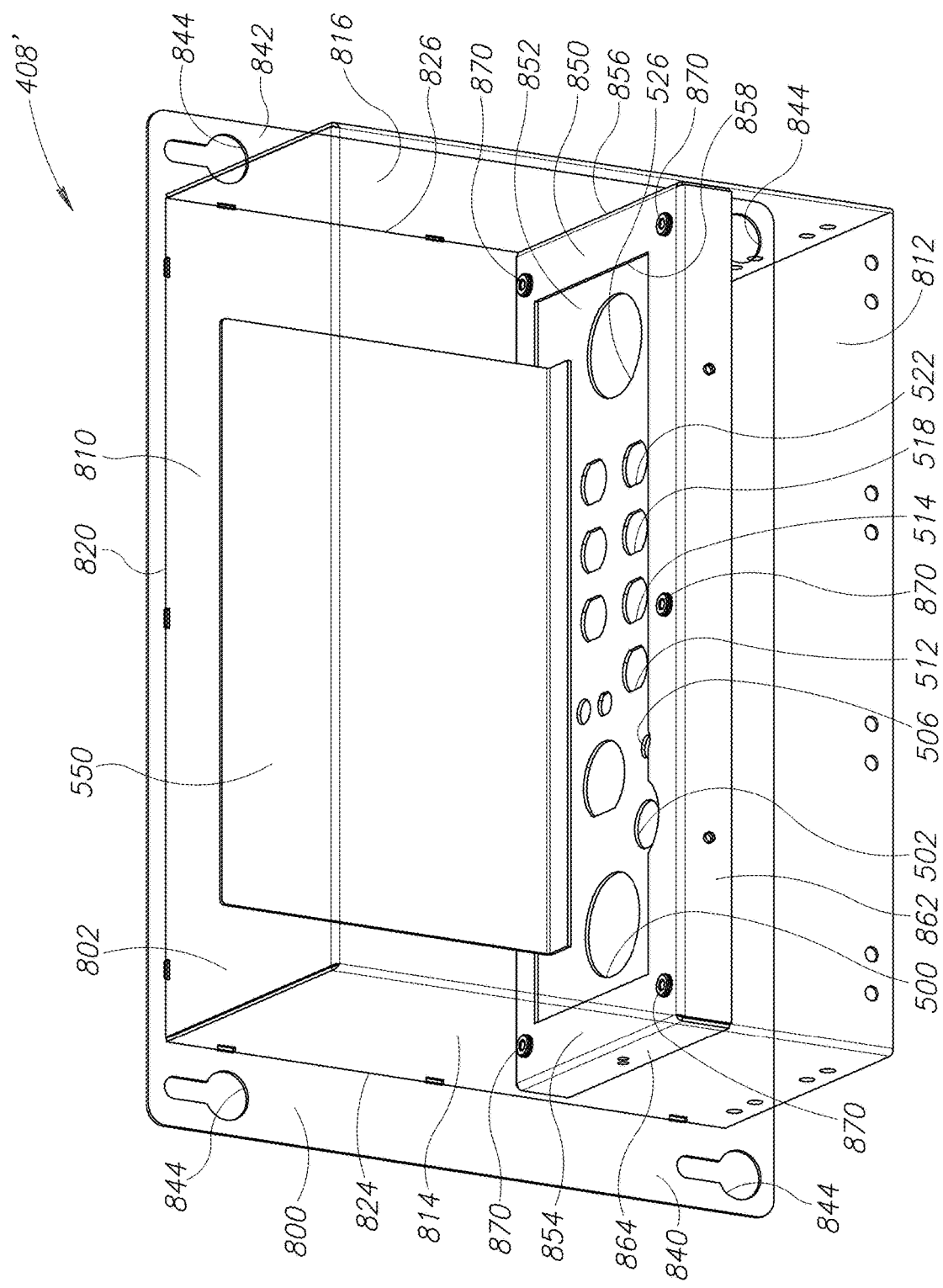
FIG. 16 is a top perspective view of an alternate embodiment of a housing assembly that may be used to construct the data logger of FIG. 4.

FIG. 16 depicts an alternate embodiment of the housing assembly 408 (see FIGS. 4 and 5). Referring to FIG. 16, a housing assembly 408' may be used instead and in place of the housing assembly 408 (see FIGS. 4 and 5). In the housing assembly 408', the outer housing 410 (see FIGS. 4 and 5) has been replaced with a back plate 800 and a front cover member 802. In FIG. 16, the front cover member 802 has been illustrated as being transparent. However, in FIG. 17, the front cover member 802 is illustrated as being solid.

Referring to FIG. 16, the front cover member 802 has a top side 810, a front side 812, a first side 814, and a second side 816. The first side 814 is opposite the second side 816. The front cover member 802 is open opposite the top and front sides 810 and 812. Edges 820, 824, and 826 of the top, first, and second sides 810, 814, and 816, respectively, that are opposite the front side 812 are attached to the back plate 800 and form a watertight seal therewith.

Figure 17:
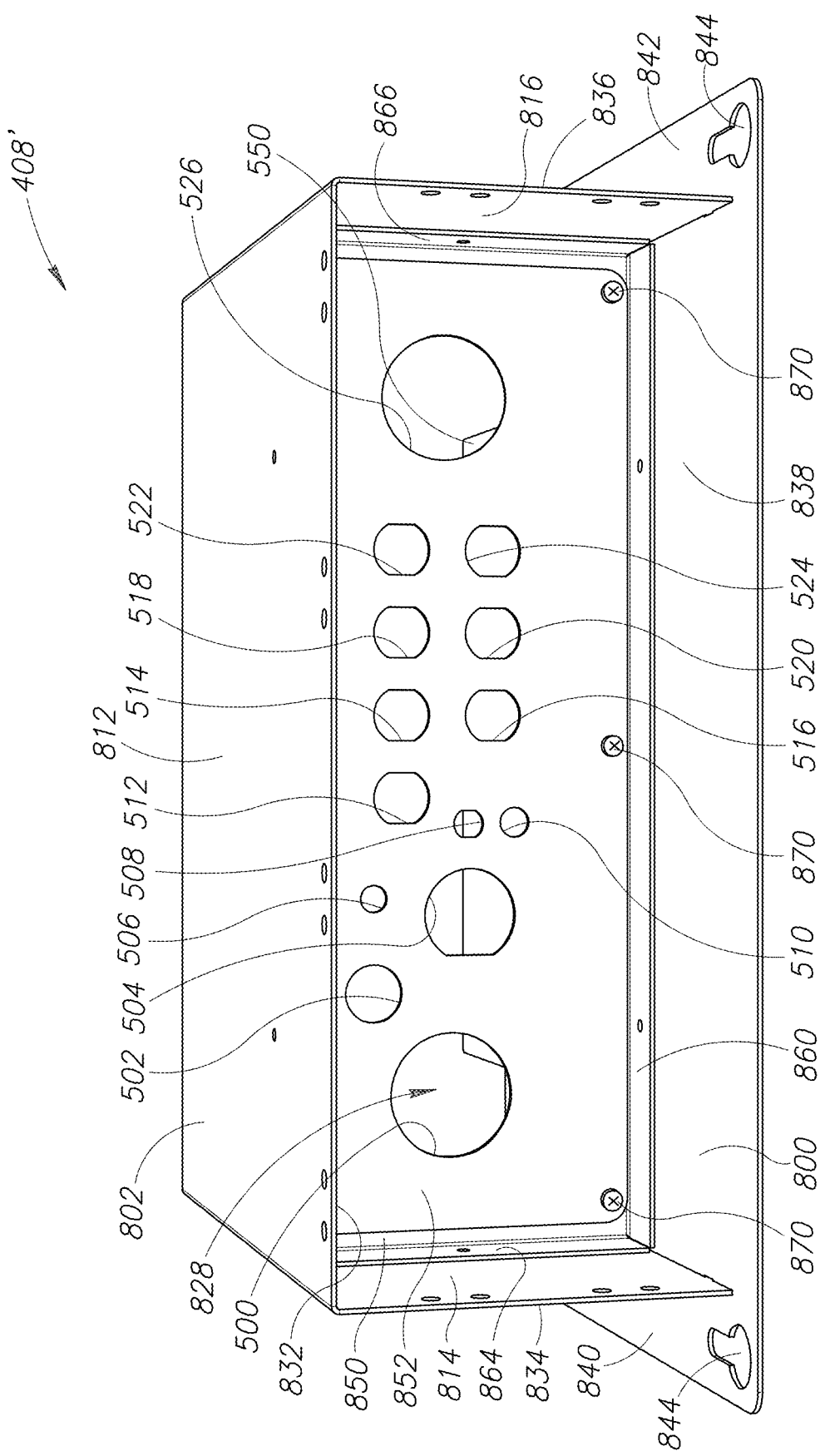
FIG. 17 is a bottom perspective view of the housing assembly of FIG. 16.

Referring to FIG. 17, together, the back plate 800 and the front cover member 802 define an interior 828 that is substantially similar to the interior 426 (see FIG. 5) of the outer housing 410 (see FIGS. 4 and 5). However, the interior 828 is open along edges 832, 834, and 836 of the front, first, and second sides 812, 814, and 816, respectively. The edges 832, 834, and 836 are opposite the top side 810 (see FIG. 16). In other words, a lower opening 838 is defined between the edges 832, 834, and 836.

The back plate 800 extends outwardly beyond the first and second sides 814 and 816 to define flanges 840 and 842, respectively. Fasteners (not shown) substantially similar to the fasteners 454 (see FIGS. 4 and 4) may be inserted into through-holes 844 formed in the flanges 840 and 842. The fasteners (not shown) may be used to affix the housing assembly 408' to a wall of the vault 12 (see FIGS. 1 and 14).

Referring to FIG. 16, in the housing assembly 408', the internal housing 466 (see FIGS. 5-10) is replaced with a frame member 850 and a plate 852. In the embodiment illustrated, the frame member 850 has a top portion 854 surrounded by a periphery 856 and a through-hole 858 spaced inwardly from the periphery 856. Flanges 860 (see FIG. 17), 862, 864, and 866 (see FIG. 17) extend downwardly from the top portion 854. Referring to FIG. 17, the frame member 850 is spaced upwardly from the edges 832, 834, and 836 inside the interior 828. Referring to FIG. 16, the flanges 860, 862, 864, and 866 are attached to and form a watertight seal with the back plate 800, the front side 812, the first side 814, and the second side 816, respectively.

The plate 852 is mounted to the underside of the top portion 854 of the frame member 850. Referring to FIG. 17, the plate 852 includes the apertures 500-526, which are positioned within the through-hole 858 (see FIG. 16) of the frame member 850. Referring to FIG. 16, the plate 852 is removably attached to the frame member 850 by fasteners 870 (e.g., screws, bolts, and the like). A substrate 550 (e.g., a printed circuit board ("PCB")) is mounted on the plate 852 and extends upwardly therefrom. In the embodiment illustrated, the substrate 550 is not attached to the back plate 800, the front cover member 802, and the frame member 850. Thus, referring to FIG. 17, the substrate 550 and the components mounted on the substrate 550 may be removed from the housing assembly 408' through the lower opening 838.

The housing assembly 408' may be characterized as being like a diving bell that traps air and prevents the sensor(s) 402A (see FIGS. 14 and 15) and electrical components 404 (see FIGS. 9-11 and 13) located inside the data logger 400 from being submerged when the water 80 (see FIG. 1) infiltrates the vault 12 (see FIGS. 1 and 14). The housing assembly 408' may be sized to trap air and protect the sensor(s) 402A and the electrical components 404 at an internal pressure of up to 2 atmospheres (or in about 30 feet of water).

Referring to FIG. 9, the electrical components 404 include the substrate 550 that is attached to the back portion 482 (see FIG. 8) of the internal housing 466 by one or more fasteners 552 (e.g., screws, bolts, and the like). In the embodiment illustrated, the internal housing 466 includes blocks B5-B8 at the locations whereat the fasteners 552 are used to attach the substrate 550 to the internal housing 466.

Figure 10:
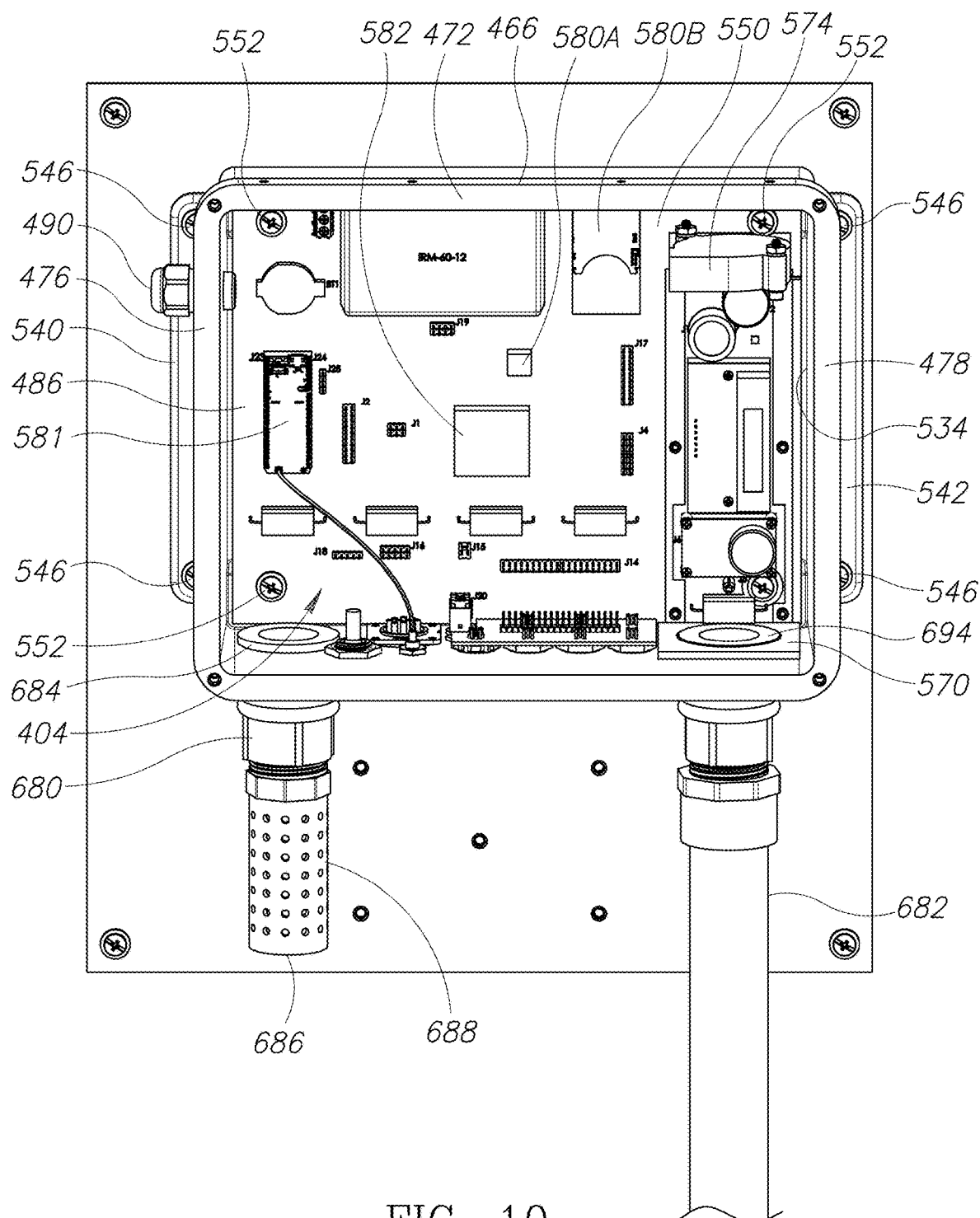
FIG. 10 is a top perspective view of a portion of internal components positioned inside the internal housing of the data logger of FIG. 4.
Figure 11:
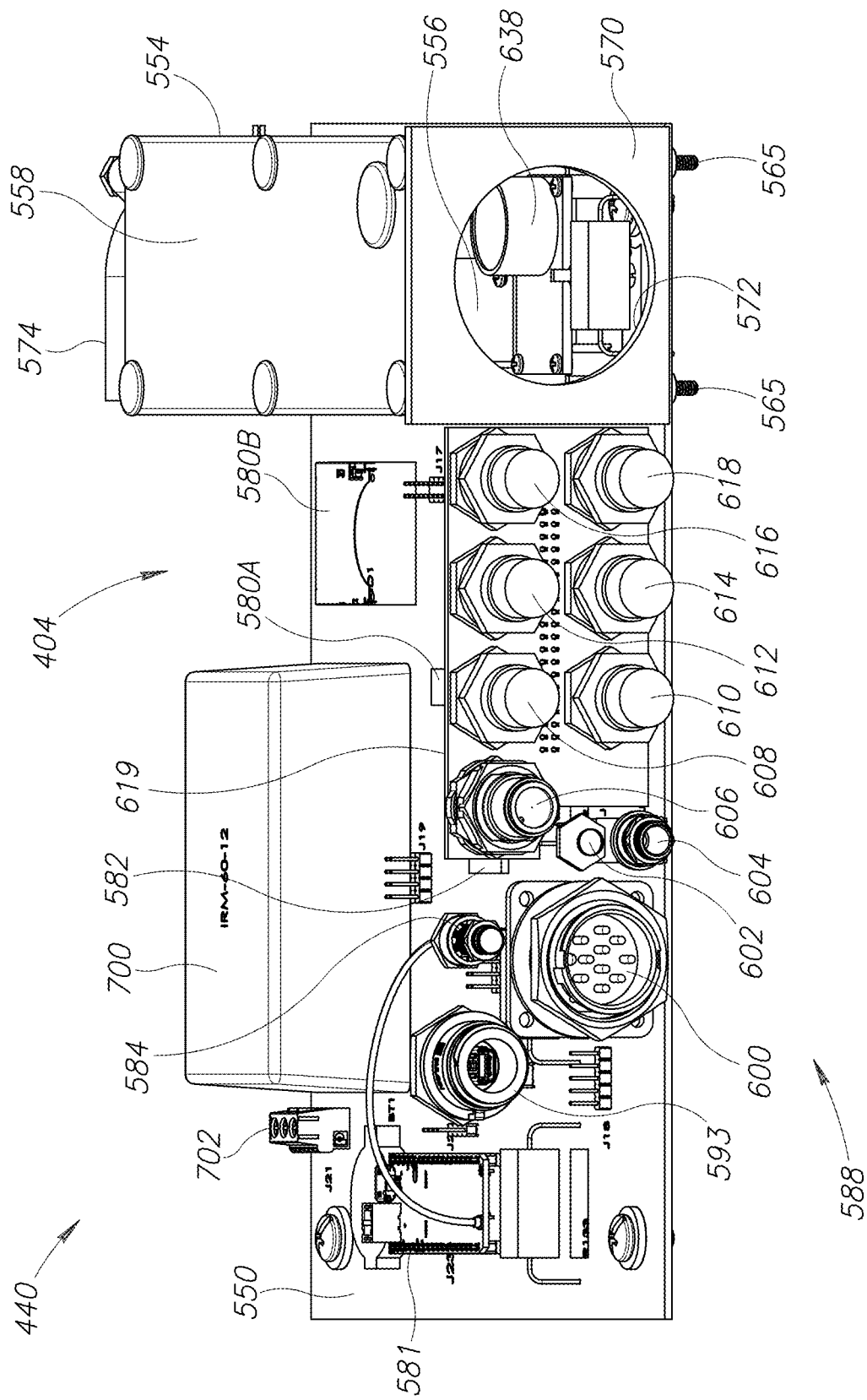
FIG. 11 is a bottom perspective view of electrical components mounted on a substrate of the data logger of FIG. 4 including an enclosure and gasket.
Figure 12:
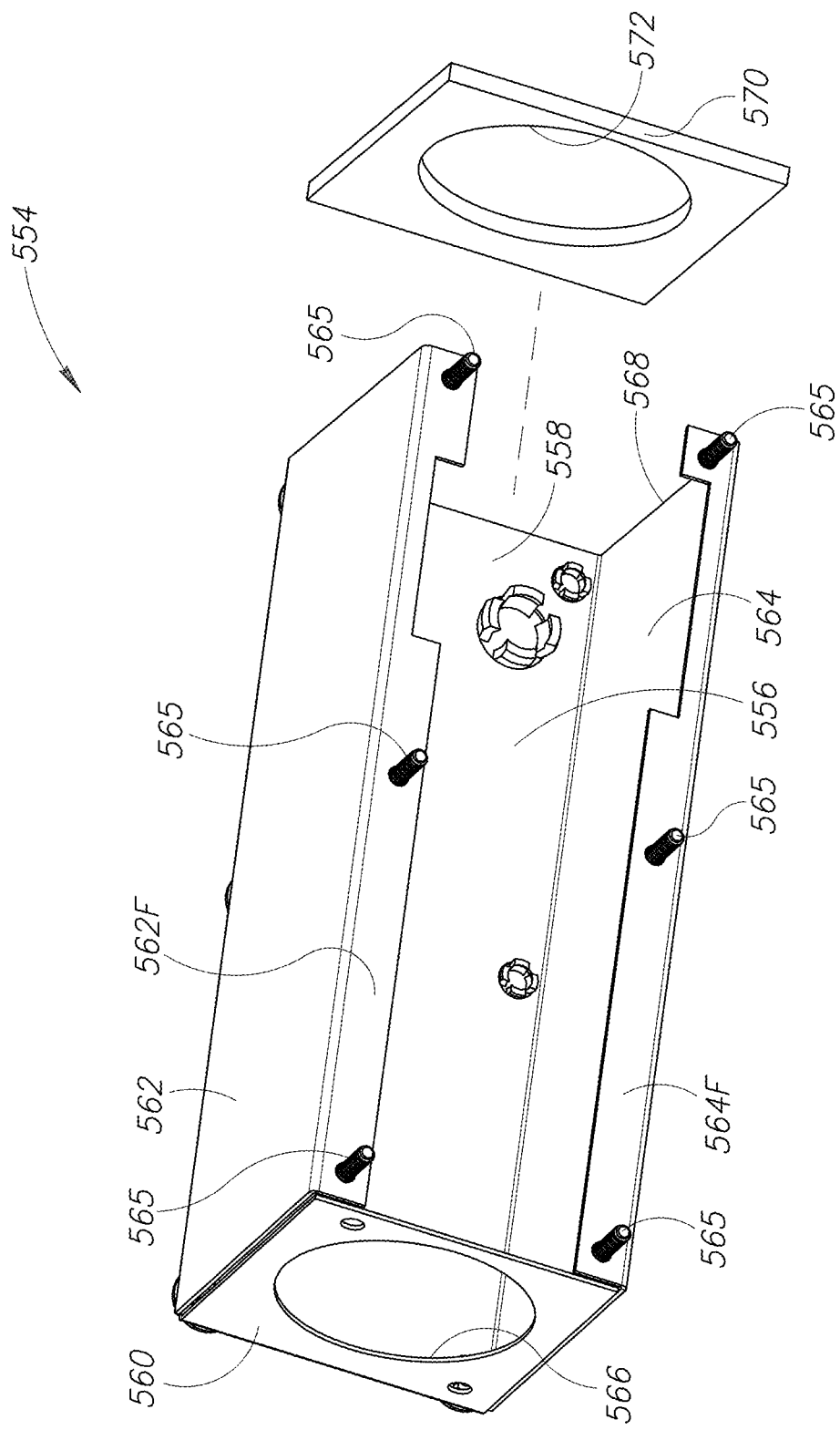
FIG. 12 is a partially exploded bottom perspective view of the enclosure and the gasket of the data logger of FIG. 4.

Referring to FIG. 11, the internal components 440 include an enclosure 554 mounted on the substrate 550 and defining an air-filled plenum 556 in between the enclosure 554 and the substrate 550. The plenum 556 may be characterized as being a test chamber. Referring to FIG. 12, in the embodiment illustrated, the enclosure 554 has a generally square or rectangular outer shape with a front side 558, a top side 560, and first and second sides 562 and 564. The first and second sides 562 and 564 are opposite one another. The top, first, and second sides 560, 562, and 564 each extends rearwardly from the front side 558. Flanges 562F and 564F may be formed in the first and second sides 562 and 564, respectively. The flanges 562F and 564F extend inwardly toward one another and are configured to receive fasteners 565 that fasten the enclosure 554 to the substrate 550 (see FIGS. 9-11 and 13). The top side 560 has a through-hole 566 formed therein. Opposite the top side 560, an opening 568 is defined in the enclosure 554 between the front side 558, the first side 562, and the second side 564. A gasket 570 covers the opening 568. The gasket 570 includes a through-hole 572. Thus, the through-holes 566 (see FIG. 12) and 572 both provide access into the plenum 556.

Referring to FIG. 11, the electrical components 404 include a fan 574 mounted on the top side 560 (see FIG. 12) of the enclosure 554 and positioned to blow air into the plenum 556 (or out of the plenum 556) via the through-hole 566 (see FIG. 12). Referring to FIG. 13, the fan 574 may be mounted to the top side 560 (see FIG. 12) by one or more fasteners 576 (e.g., screws, bolts, and the like).

The electrical components 404 include one or more heat generating components R1-R5 configured to prevent moisture from condensing inside the internal housing 466 (see FIGS. 5-10) and/or the enclosure 554 (see FIGS. 9, 11, and 12). In the embodiment illustrated, the heat generating components R1-R5 have each been implemented as a resistor mounted on the substrate 550. The heat generating components R1-R4 are mounted on the substrate 550 outside the enclosure 554 (see FIGS. 9, 11, and 12) and the heat generating component R5 is mounted on the substrate 550 inside the enclosure 554 near the gasket 570.

The electrical components 404 include a memory 580 (see FIG. 14) mounted on the substrate 550 and configured to store data long-term and/or temporarily during processing. In the embodiment illustrated, the memory 580 (see FIG. 14) includes memories 580A and 580B. The memory 580A may include multiple different types of memory (e.g., random access memory, volatile memory, non-volatile memory, and the like). The memory 580A may include removable and/or non-removable types of memory. By way of a non-limiting example, the memory 580B may be implemented at least in part as a Secure Digital ("SD") card and a removable SD card reader. The SD card may be removed and/or replaced as desired.

The electrical components 404 include a processor 582 configured to receive data, process data, and store data in the memory 580.

The electrical components 404 include a cellular modem 581 connected to the processor 582. By way of non-limiting example, the cellular modem 581 may be implemented as a cellular-connected microcontroller, such as an Electron 3G or 2G sold by Particle of San Francisco, Calif. (which operates a website at www.particle.io/). The processor 582 is configured to instruct the cellular modem 581 to produce a cellular radio frequency ("RF") signal. The cellular modem 581 may be connected (e.g., via a wire 586) to a wireless network interface 584. The wireless network interface 584 may be implemented as a connector, such as a coaxial jack (e.g., a subMiniature version A ("SMA") connector jack sold by Amphenol under model number 132422).

Referring to FIG. 14, the wireless network interface 584 may be mounted in the aperture 506 (see FIG. 8) and configured to be connected (e.g., via a wire 583) to an external antenna 585. The wireless network interface 584 may be configured to receive a cellular RF signal from the cellular modem 581 (via the wire 586) and broadcast the cellular RF signal via an internal (e.g., PCB mounted) antenna (not shown) or the external antenna 585. For example, the internal antenna may be mounted within the cellular modem 581 or on the substrate 550 (see FIGS. 9-11 and 13). The cellular RF signal may be sent to one or more external devices or systems (e.g., illustrated as an external system 587). By way of a non-limiting example, the external system 587 may be implemented as a computing system, a manhole event suppression system (e.g., like the manhole event suppression system 100), and the like. The antenna 585 may also be configured to receive a cellular RF signal from the external devices or systems (e.g., the external system 587) and provide the received RF signal to the processor 582 via the wireless network interface 584 and the wire 586.

As is apparent to those of ordinary skill in the art, the antenna 585 sends and receives RF signals via a wireless data link "C1" with at least one network 590 (e.g., a wireless network connected to the Internet). The antenna 585 may be positioned inside or outside the vault 12 and at or above the surface 30 to help ensure a good connection with the network 590. In the embodiment illustrated, the antenna 585 is positioned underneath the manhole cover 130. However, this is not a requirement. The network 590 may include at least one of the local area network 220 (see FIG. 2), the wide area network 240 (see FIG. 2), a conventional local area network, a conventional wide area network, a wireless network, the Internet, the plain old telephone service ("POTS"), and the like.

As mentioned above, the antenna 585 is configured to provide communication between the data logger 400 and the network 590. The network 590 may include the local area network 220 and/or a wide area network of manhole event suppression systems (e.g., each like the system 100). This arrangement allows each manhole event suppression system to receive measurements from adjacent or neighboring manhole event suppression systems and adjust operations of a local manhole event suppression system to improve (e.g., optimize) its performance. Thus, the data logger 400 may be configured to receive information and/or commands from the network 590 and operate the manhole event suppression system 100 based on the information and/or commands received. This arrangement also allows the data logger 400 to control multiple systems near the data logger 400 and/or remote from the data logger 400.

Optionally, the data logger 400 may be connected to the network 590 by a wired network interface 593 instead of or in addition to the wireless network interface 584 (or wireless network interface). The wired network interface 593 may be mounted in the aperture 502 (see FIG. 8). In the embodiment illustrated, the wired network interface 593 is connected to the network 590 by one or more cables 595 and/or other networking components known to those of ordinary skill in the art. By way of a non-limiting example, the wired network interface 593 may be implemented as a Universal Serial Bus ("USB") connection.

The memory 580 may store a map or similar information identifying nearby vaults (like the vault 12). Thus, the processor 582 may use this information to monitor nearby vaults and determine if any activity is occurring with respect to such vaults. The information may include location information for the vaults that the processor 582 may use to identify nearby vaults.

The processor 582 may be connected (e.g., via a wire 577) to a system interface 596 that may be configured to control the air-moving device 94 (see FIG. 1) of the manhole event suppression system 100. The system interface 596 may be connected to the air-moving device 94 (see FIG. 1) by one or more cables 589. In the embodiment illustrated, the system interface 596 has been implemented as an expansion port 600 (see FIG. 11) that is mounted in the aperture 504 (see FIG. 8). Referring to FIG. 11, the expansion port 600 may be implemented as a 10 POS Circular Connector sold by Switchcraft, Inc. under the model number 14380-10SG-300. In embodiments in which the expansion port 600 does not function as the system interface 596 (see FIG. 14), the expansion port 600 may be used as an interface for one or more additional sensors.

The data logger 400 may be configured to control the manhole event suppression system 100. For example, the data logger 400 may be configured to turn the system 100 (e.g., the air-moving device 94 depicted in FIG. 1) on and off. The data logger 400 may be configured to adjust the performance of the system 100 to meet the conditions based on data measured by the sensor(s) 402 (see FIGS. 13 and 15). The data logger 400 may be configured to instruct the system 100 to execute a pre-programmed time routine. By way of another non-limiting example, the data logger 400 may receive one or more external triggers or commands from the wireless and/or wired network interfaces 584 and 593 and instruct the system 100 based on those commands.

The external system 587 may include a centralized computing system (not shown) configured to provide centralized data storage, data analytics, automated limit alarms, and/or notifications. Data collected by the wide area network 240 may be used to identify out of limit data, raise alarms (or flags) indicating a possible or imminent problem, and/or initiate investigatory work to prevent a catastrophic failure. The data collected by the external system 587 may be stored and analyzed to increase the understanding of manhole events. For example, the data may be used to identify the triggers leading to manhole events and the precursors to manhole events. Further, the data may be used to determine how to optimize the performance of the system 100 and other systems connected to the external system 587 (e.g., via the network 590). Special instructions can be communicated back to the external system 587 to optimize performance and/or change the behavior of the manhole event suppression systems connected to the external system 587.

The cellular RF signal sent by the processor 582 may include an email, a telephone call, a text message, and the like. The cellular RF signal may be sent (e.g., via the network 590) to the external system 587 and/or a computing device 591 (e.g., a cellular telephone, laptop computing device, desktop computer, and the like) operated by a human systems operator 597. The computing device 591 may be connected to the network 590 by a wired or wireless data link "C2."

The external system 587 may be a controller implemented as one or more computing devices, a virtual machine executing on a cloud computing system, and the like. Data collected by the data logger 400 may be sent to the external system 587 via the network 590 and/or removable memory components (e.g., a removable SD card) of the memory 580. The data collected may be stored in a database (e.g., in the cloud computing system).

As mentioned above, the data logger 400 may be configured to communicate with and control external devices, such as electrical system equipment. In such embodiments, the processor 582 may send instructions to one or more external devices via the system interface 596, the wireless network interface 584, and/or the wired network interface 593.

The processor 582 may include or be connected to a clock 592 that is substantially similar to the clock 206 (see FIG. 2). The clock 592 may be used by the processor 582 to time stamp data. Optionally, the clock 592 may serve as an alarm that transitions the data logger 400 from a "sleep mode" to a "collect data mode." Alternatively, the processor 582 may use information received (e.g., in a monitoring signal) from one or more of the sensor(s) 402 (see FIGS. 13 and 15) to determine when the data logger 400 (see FIGS. 4, 5, and 14) should enter the sleep mode. The sleep mode helps preserve a lifespan of the data logger 400.

Referring to FIG. 13, the electrical components 404 may include or be connected to the sensor(s) 402. The sensor(s) 402 may include any of the sensors included in the sensor array 300 (see FIGS. 2 and 3). Optionally, when the sensor(s) 402 include two or more different sensors, the electrical components 404 may include a MUX 594 (see FIG. 14) that is substantially similar to the MUX 210 (see FIG. 2) and configured to combine data from the sensors 402 into a single sensor output to be processed by the processor 582.

Referring to FIG. 14, various components (e.g., the memory 580, the clock 592, the MUX 594, etc.) may be connected to the processor 582 by a bus 578. The bus 578 may be any of several types of bus structures including a memory bus or memory controller, a peripheral bus, and a local bus using any of a variety of bus architectures.

Figure 15:
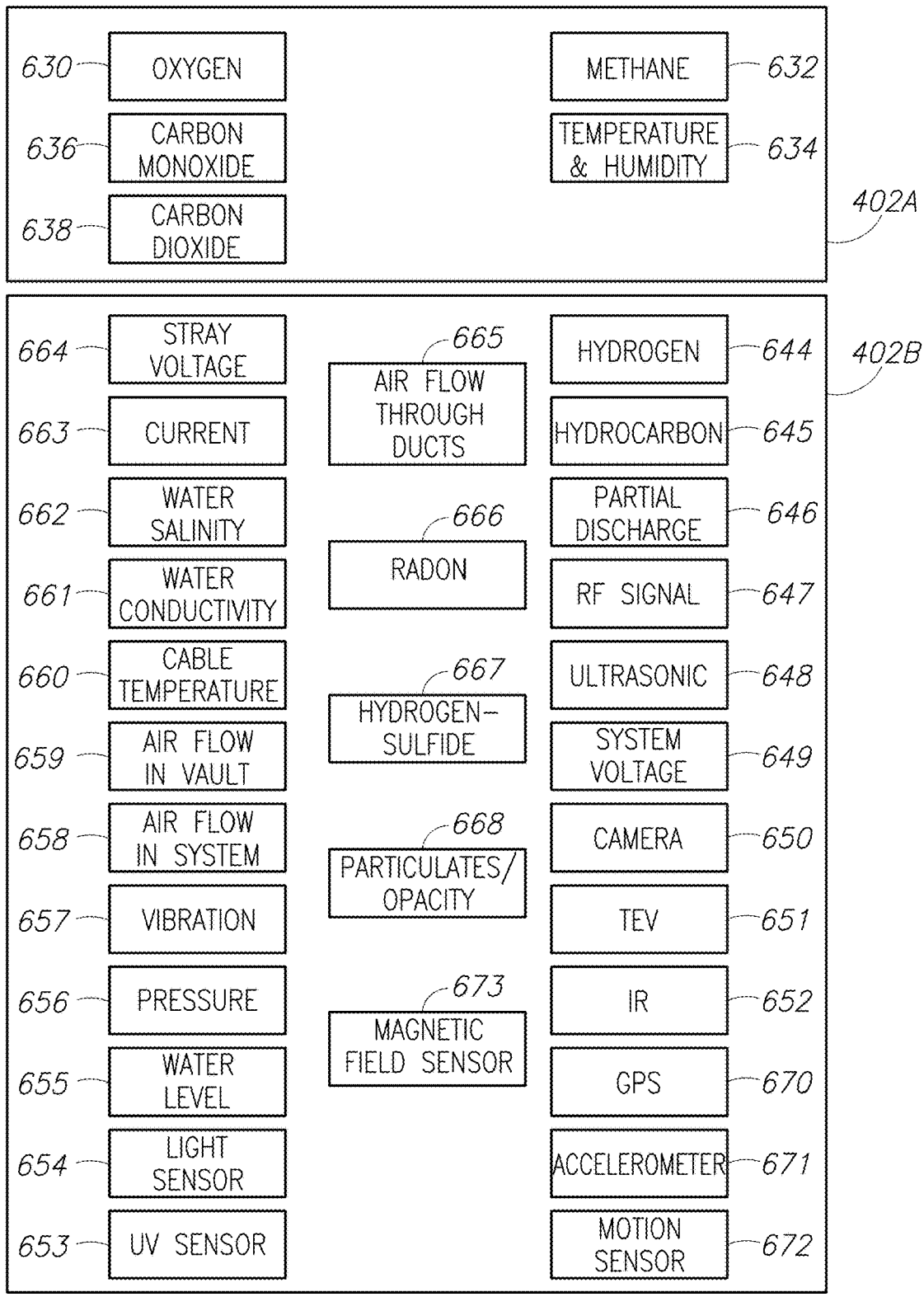
FIG. 15 is a block diagram of exemplary sensors that may be included in the data logger of FIG. 4.

The electrical components 404 include a connector 602 configured to be connected to the float switch 575 (see FIG. 14). Referring to FIG. 15, a water level sensor 655 may be positioned inside the data logger 400 and connected by the connector 602 to the float switch 575. Information received from the water level sensor 655 (see FIG. 15) may be used by the processor 582 to determine when to turn off the fan 574 (see FIGS. 9-11 and 13). The connector 602 may be mounted in the aperture 508 (see FIG. 8). By way of non-liming examples, the data connector 602 may be implemented using a connector sold by CONEC USA under the model number 42-01032, and the like.

The electrical components 404 include a DC power connector 604 configured to supply optional DC power (e.g., 12 V) to the electrical components 404. For example, the DC power may be useful in a laboratory during development. The DC power connector 604 may be mounted in the aperture 510 (see FIG. 8). By way of non-liming examples, the data connector 604 may be implemented using a direct current ("DC") power connector sold by Switchcraft, Inc. under the model number 502-RAPC10PS, and the like.

Referring to FIG. 13, the electrical components 404 may include or be connected to I/O components 588 configured to provide an interface between the processor 582 and the sensor(s) 402B (see FIG. 14). Referring to FIG. 11, in the embodiment illustrated, the I/O components 588 include data connectors 606-618. By way of non-liming examples, the data connectors 606-618 may be implemented using circular connectors sold by Amphenol Corporation under model number 12-04PMMP-SF8001, and the like. The data connectors 606-618 may be mounted in the apertures 512-524 (see FIG. 8), respectively.

Referring to FIG. 14, the data connectors 606-618 (see FIG. 11) of the I/O components 588 may be connected to the sensor(s) 402B by one or more cables 620. By way of a non-limiting example, the data connector 606 may be connected to the pressure sensor 656 (see FIG. 15) by a cable (not shown). By way of another non-limiting example, the data connectors 608, 612, and 616 may be connected to mass airflow sensors (e.g., the airflow sensors 658, 659, and 665 illustrated in FIG. 15) by cables (not shown). By way of yet another non-limiting example, the data connectors 610, 614, and 618 may be connected to temperature sensors (e.g., the cable temperature sensor 660 illustrated in FIG. 15) by cables (not shown).

The data connectors 606-618 (see FIG. 11) of the I/O components 588 are also connected to the processor 582. In FIG. 14, this connection is illustrated by a line 622 that connects the I/O components 588 to the MUX 594. However, the line 622 may alternatively connect the I/O components 588 directly to the bus 578, the memory 580, or the processor 582. Referring to FIG. 11, in the embodiment illustrated, the data connectors 606-618 are mounted on a PCB 619 that extends upwardly from the substrate 550. Referring to FIG. 13, the PCB 619 may include a header H1 configured to be connected (e.g., by a ribbon cable, not shown) to a corresponding header H2 on the substrate 550. Each of the data connectors 606-618 is connected by conductors (e.g., traces, not shown) to the header H1. The header H2 is connected to the processor 582 by conductors (e.g., traces, not shown). Thus, the data connectors 606-618 are connected to the processor 582. Optionally, as illustrated in FIG. 14, the MUX 594 may be connected between the data connectors 606-618 (see FIG. 11) and the processor 582.

Referring to FIG. 14, in the embodiment illustrated, the sensor(s) 402A are mounted on the substrate 550 (see FIGS. 9-11 and 13). For example, referring to FIG. 13, the sensor(s) 402A (see FIG. 14) may include one or more gas sensors mounted on the substrate 550 within the air-filled plenum 556 (see FIGS. 11 and 12) defined by the enclosure 544 (see FIGS. 9-12).

In the embodiment illustrated, the sensor(s) 402A (see FIG. 14) include an oxygen ($O_2$) sensor 630, a methane ($CH_4$) sensor 632, a humidity and temperature sensor 634, a carbon monoxide (CO) sensor 636, and a carbon dioxide ($CO_2$) sensor 638 mounted on the substrate 550 and positioned inside the air-filled plenum 556 (see FIGS. 11 and 12). The oxygen ($O_2$) sensor 630 may be substantially identical to the oxygen sensor 310 (see FIG. 3). The carbon monoxide (CO) sensor 636 may be substantially identical to the carbon monoxide sensor 311 (see FIG. 3). The carbon dioxide ($CO_2$) sensor 638 may be substantially identical to the carbon dioxide sensor 312 (see FIG. 3). The methane ($CH_4$) sensor 632 may be substantially identical to the methane sensor 314 (see FIG. 3). The humidity and temperature sensor 634 may be configured to provide the same functionality as the humidity sensor 324 (see FIG. 3) and the vault temperature sensor 329 (see FIG. 3).

In FIG. 14, a line 640 represents a connection between the sensor(s) 402A and the MUX 594. However, the line 640 may alternatively connect the sensor(s) 402A directly to the bus 578, the memory 580, or the processor 582. By way of non-limiting examples, each of the sensors 630-638 (see FIG. 13) may be connected by conductors (e.g., traces, not shown) to the MUX 594, the bus 578, the memory 580, or the processor 582.

In FIG. 14, a line 642 represents a communication connection between the fan 574 and the processor 582. The processor 582 is configured to turn the fan 574 on and off to replace the air inside the plenum 556 (see FIGS. 11 and 12). Referring to FIG. 13, when the processor 582 turns on the fan 574, the fan 574 may blow air into or out of the plenum 556 (see FIGS. 11 and 12). For example, the fan 574 may blow new air from the interior 486 (see FIG. 9) into the plenum 556 (see FIGS. 11 and 12) through the through-hole 566 (see FIG. 12). This air flows through the plenum 556 (see FIGS. 11 and 12) and out of the through-hole 572 in the gasket 570. By way of another non-limiting example, the fan 574 may blow air out of the plenum 556 (see FIGS. 11 and 12) through the through-hole 566 (see FIG. 12). In such embodiments, new air flows into the plenum 556 (see FIGS. 11 and 12) from the through-hole 572 in the gasket 570. After the air inside the plenum 556 (see FIGS. 11 and 12) has been replaced with the new air, the processor 582 receives readings from the sensors 630-638.

Referring to FIG. 15, the sensor(s) 402B positioned outside the outer housing 410 may include one or more of the following sensors:

A hydrogen sensor 644 that may be substantially identical to the hydrogen sensor 313 (see FIG. 3).

A hydrocarbon sensor 645 that may be substantially identical to the hydrocarbon sensor 315 (see FIG. 3).

A partial discharge sensor 646 that may be substantially identical to the partial discharge sensor 316 (see FIG. 3).

An RF signal sensor 647 that may be substantially identical to the RF signal sensor 317 (see FIG. 3).

An ultrasonic sensor 648 that may be substantially identical to the ultrasonic sensor 318 (see FIG. 3).

A system voltage sensor 649 that may be substantially identical to the system voltage sensor 320 (see FIG. 3).

A camera 650 that may be substantially identical to the camera 321 (see FIG. 3).

A TEV sensor 651 that may be substantially identical to the TEV sensor 319 (see FIG. 3).

An IR sensor 652 that may be substantially identical to the IR sensor 322 (see FIG. 3).

A UV sensor 653 that may be substantially identical to the UV sensor 336 (see FIG. 3).

A light sensor 654 that may be substantially identical to the light sensor 323 (see FIG. 3).

The water level sensor 655 that may be substantially identical to the water level sensor 325 (see FIG. 3).

A pressure sensor 656 that may be substantially identical to the pressure sensor 328 (see FIG. 3).

A vibration sensor 657 that may be substantially identical to the vibration sensor 333 (see FIG. 3).

A suppression system airflow sensor 658 that may be substantially identical to the suppression system air flow sensor 332 (see FIG. 3).

A vault/conduit airflow sensor 659 that may be substantially identical to the vault/conduit air flow sensor 331 (see FIG. 3).

A cable temperature sensor 660 that may be substantially identical to the cable temperature sensor 330 (see FIG. 3).

A conductivity of water sensor 661 that may be substantially identical to the conductivity of water sensor 327 (see FIG. 3).

A salinity of water sensor 662 that may be substantially identical to the salinity of water sensor 326 (see FIG. 3).

A current sensor 663 that may be substantially identical to the current sensor 335 (see FIG. 3).

A stray voltage sensor 664 that may be substantially identical to the stray voltage sensor 334 (see FIG. 3).

A duct airflow sensor 665 that is configured to determine airflow through the conduits 20A. The duct airflow sensor 665 may be substantially similar to the vault/conduit air flow sensor 331 (see FIG. 3).

A radon sensor 666 configured to detect a level of radon in the vault 12. For example, the radon sensor 666 may measure a concentration of radon contained in the vault 12 (e.g., as a total percentage, a ROC, etc.).

A hydrogen-sulfide sensor 667 configured to measure a concentration of hydrogen-sulfide contained in the vault 12 (e.g., as a total percentage, a ROC, etc.).

A particulates/opacity sensor 668 configured to measure a concentration of particulates in the internal atmosphere 104 inside the vault 12.

A global positioning system ("GPS") 670 configured to determine where the data logger 400 is located.

An accelerometer 671 configured to determine when a manhole event occurs.

A motion sensor 672 configured to determine when a manhole event occurs.

A magnetic field sensor 673 configured to monitor changes or fluctuations in the magnetic field.

The GPS 670 may be used to report where the data logger 400 is currently located. Any of the sensors 644-672 may be implemented as one of the sensor(s) 402B or one of the sensor(s) 402A.

One or more of the gas sensors 630, 632, 636, 638, 644, 645, 666, and 667 may be implemented using a nondispersive infrared ("NDIR") sensor.

Referring to FIG. 9, conduits 680 and 682 may extend downwardly from the internal housing 466. By way of non-limiting examples, the conduits 680 and 682 may each be constructed from pipe sections and/or fittings (e.g., constructed from fiberglass, non-halogenated plastics, polyvinyl chloride ("PVC"), stainless steel, aluminum alloy and the like).

Referring to FIG. 10, the conduit 680 passes through the aperture 500 (see FIG. 8), has a proximal end 684 positioned inside the internal housing 466, and has a free distal end 686 positioned inside the outer housing 410 (see FIGS. 4 and 5). The free distal end 686 may include a filter 688. The conduit 680 allows fresh air to flow into the internal housing 466 from the outer housing 410. Fresh air may enter the outer housing 410 via one or more of the apertures 430 and 432 (see FIG. 4).

The conduit 682 passes through the aperture 432 (see FIG. 4) in the outer housing 410, the aperture 526 (see FIG. 8) in the internal housing 466, and the through-hole 572 (see FIGS. 11-13) in the gasket 570 (see FIGS. 10-13). Thus, the conduit 682 has a proximal end 694 (see FIG. 10) positioned inside the air-filled plenum 556 (see FIGS. 11 and 12) of the enclosure 554. Referring to FIG. 4, opposite the proximal end 694 (see FIG. 10), the conduit 682 has a free distal end 696 positioned outside the outer housing 410. The free distal end 696 may be positioned at or near the floor 58 (see FIGS. 1 and 14) of the vault 12 (see FIGS. 1 and 14). The free distal end 696 may include a filter 698 (see FIG. 4). Referring to FIG. 5, the conduit 682 allows fresh air to flow into the enclosure 554 (see FIGS. 9, 11, and 12) from the vault 12 (see FIGS. 1 and 14) and bypass the interior 426 of the outer housing 410. Referring to FIG. 4, the conduit 682 and/or the filter 698 may include a plurality of through-holes 699 that allow air to flow into the conduit 682 from different locations at or near the floor 58 (see FIGS. 1 and 14).

Referring to FIG. 10, the processor 582 may periodically turn on the fan 574, which expels the air inside the plenum 556 (see FIGS. 11 and 12) and draws new air into the plenum 556 through the through-hole 572 (see FIGS. 11-13) in the gasket 570. The conduit 682 supplies air to the plenum 556 (via the through-hole 572) from inside the vault 12 (at or near the floor 58 illustrated in FIGS. 1 and 14). Thus, the fan 574 moves new air into the plenum 556 (see FIGS. 11 and 12) from inside the vault 12 (see FIGS. 1 and 14).

Referring to FIG. 14, the processor 582 uses the sensor(s) 402 (see FIGS. 13 and 15) to collect data about the conditions inside the vault 12. The processor 582 may instruct the sensor(s) 402 to collect data constantly or occasionally.

Constant data collection or sampling may be implemented using one or more ring buffers and/or an integrator. A ring buffer may be used to store and/or upload data with high temporal resolution on either side of a configurable trigger condition without requiring high resolution data to be stored or transmitted during normal operation. The ring buffer has a fixed size and runs constantly at a high frequency (1 Hz, for example). Each new value written to the ring buffer overwrites the oldest value stored in the ring buffer. However, the values stored in the ring buffer are not transmitted (e.g., over the wireless data link "C1") or written to the memory 580 (see FIG. 14) until a trigger condition is satisfied. Once this trigger condition is satisfied, the entire ring buffer may be written and/or transmitted along with high temporal resolution data for a configurable time (e.g., 10 minutes) after the trigger condition is satisfied. A different ring buffer may be used with any of the sensor(s) 402 (see FIG. 13), and the trigger condition may be based on filtered or unfiltered output from any of the sensor(s) 402 or combination thereof.

For example, four ten minute long ring buffers (e.g., storing up to 600 samples at 1 Hz) may be used, one for each of the four gas sensors 630, 632, 636, and 638. The trigger condition for all four of the ring buffers may be the oxygen ($O_2$) concentration dropping below 20%. Thus, when the oxygen concentration (as measured by the oxygen sensor 630) falls below 20%, the data stored in all four ring buffers (which store data from the past 10 minutes) along with 1 Hz data for the next 10 minutes may be uploaded (e.g., over the wireless data link "C1") and/or stored in the memory 580.

An integrator or integrating buffer may be used to reduce sensor noise without requiring high temporal resolution data to be transmitted, stored, and processed. Data may be transferred (e.g., over the wireless data link "C1" and/or to the memory 580) at a transfer rate that is slower than a sample collection rate of one or more of the sensor(s) 402. An integrating buffer may be configured to store samples received at the sample collection rate from one of the sensor(s) 402. The integrating buffer may be filled with timestamped sensor readings (or samples) obtained from the sensor. When the integrating buffer is full, its contents are numerically integrated and divided by the temporal length of the integrating buffer to obtain a result. The result is transferred at the transfer rate (e.g., uploaded over the wireless data link "C1" and/or stored in the memory 580). Then, the integrating buffer is cleared and the process repeats.

For example, if an integrating buffer configured to store 900 samples is used and the sample collection rate of the carbon dioxide ($CO_2$) sensor 638 is 1 Hz (or one sample per second), up to 900 samples collected by the carbon dioxide ($CO_2$) sensor 638 may be stored in the integrating buffer along with corresponding timestamps. In this example, the transfer rate is one transfer every 15 minutes (or 900 seconds), which corresponds to the amount of time required to fill the integrating buffer (15 minutes). Thus, every 15 minutes, a numerical integration is performed on the contents of the integrating buffer and divided by 900 seconds to obtain the result. The result is transferred (e.g., uploaded over the wireless data link "C1" and/or stored in the memory 580) before the integrating buffer is cleared and the process repeats.

Occasional data collection or sampling may occur periodically (e.g., every 15 minutes) based on a timer (e.g., the clock 592). By way of another example, the time between successive sample collection may be adjusted based on data collected, communications received (e.g., from the external system 587 via the antenna 585), and the like. By way of another example, a rolling window of a predetermined duration (e.g., one hour) during which samples are collected more frequently (e.g., every second) may be triggered when data collected indicates that particular conditions (e.g., indicative of a manhole event) may be developing inside the vault 12.

The data logger 400 may be configured to take specific actions whenever one or more of the sensor(s) 402 (see FIGS. 13 and 15) detects a predetermined condition is present inside the vault 12. For example, the memory 580 may store one or more threshold level values for each of the sensor(s) 402. The processor 582 may trigger an alarm (e.g., send a communication) whenever the data collected by a particular one of the sensor(s) 402 exceeds or falls below a particular threshold level value. The processor 582 may be configured to trigger different types of alarms depending upon which conditions have been identified. By way of a non-limiting example, the memory 580 may store rate of change threshold values for each of the sensor(s) 402. Thus, the processor 582 may trigger an alarm (e.g., send a communication) whenever the rate of change of the data collected by a particular one of the sensor(s) 402 exceeds a particular rate of change threshold value associated with the particular sensor.

By way of another example, the processor 582 may increase the frequency at which samples are collected whenever the data collected by a particular one of the sensor(s) 402 exceeds or falls below a particular threshold level value. If the sensor(s) 402A are used to collect samples, the processor 582 triggers the fan 574 before a sample is collected.

The threshold values may be determined and/or adjusted using machine learning techniques. For example, machine learning may be used to establish threshold values distinguishing between normal and non-standard (or dangerous) conditions. In other words, machine learning may be used to determine a baseline for the vault 12 and can be used to tailor unique threshold values for each vault.

The processor 582 may trigger an alarm (e.g., send a communication) whenever a combinations of factors or conditions are satisfied (e.g., TEV and CO both exceed threshold values established for TEV and CO).

The processor 582 may be configured to activate and/or deactivate one or more of the sensor(s) 402 whenever data collected by one of the sensor(s) 402 exceeds or falls below a threshold value associate with the sensor. For example, whenever motion detected by the motion sensor 672 exceeds a threshold value, the camera 650 may be activated. Similarly, whenever motion detected by the accelerometer 671 exceeds a threshold value, the GPS 670 may be activated. One or more of the gas sensors 630, 632, 636, 638, 644, 645, 666, and 667 may be deactivated when the water level sensor 655 detects a water level inside the vault 12 (see FIGS. 1 and 14) is above a threshold value. The UV sensor 653 may be activated when the TEV sensor 651 detects a TEV value that exceeds a threshold value.

Referring to FIG. 13, the electrical components 404 include a power unit 700 configured to provide power necessary to run the electrical components 404 of the data logger 400, including the processor 582, the sensor(s) 402, the fan 574, the system interface 596, etc. In the embodiment illustrated in FIG. 14, the power unit 700 is connected to the bus 578 and provides power to the electrical components 404 (see FIG. 13) via the bus 578. The power unit 700 may receive power from a service voltage (e.g., the conductor 112 illustrated in FIG. 1), a battery, a parasitic power source, or an external power source. In the embodiment illustrated, the power unit 700 receives power from the power cable 494. By way of non-limiting examples, the cable 494 may supply 120V AC to the power unit 700 when the data logger 400 is installed for operation. Alternatively, the cable 494 may supply 240V AC or other low service voltages (e.g., up to 600V AC) to the power unit 700 when the data logger 400 is installed for operation. The power cable 494 includes wires (not shown) that may be terminated at a power interface 702 (e.g., a terminal block). In FIG. 14, a line 704 represents conductors (e.g., traces) that connect the power interface 702 to the power unit 700.

The power cable 494 is connected to an external power source 706 (e.g., a wall receptacle, the cable 110 illustrated in FIG. 1, and the like) located inside the vault 12. Referring to FIG. 4, the power cable 494 may include a connector 707 (e.g., a plug) configured to connect the power cable 494 with the external power source 706. In the embodiment illustrated, the connector 707 is implemented as a conventional plug, the external power source 706 is implemented as a conventional wall receptacle, and the connector 707 is configured to be plugged into the external power source 706. In alternate embodiments, the power cable 494 may be hardwired to the external power source 706. In additional alternate embodiments, the external power source 706 may be the cable 110 (see FIG. 1). In such embodiments, the connector 707 may be implemented as a sleeve (not shown) or a splice (not shown) configured to be connected to the conductor 112 (see FIG. 1) of the cable 110 (see FIG. 1). By way of yet another non-limiting example, the connector 707 may be implemented as an inductive coil positioned alongside the cable 110 (see FIG. 1) and configured to receive power inductively from the cable 110.

Optionally, the electrical components 404 may include a battery holder 708 configured to receive a battery (not shown). In such embodiments, the battery holder 708 may be mounted on the substrate 550 and connected by conductors (e.g., traces, not shown) to the power unit 700. The power unit 700 may receive power from the battery (not shown) via the battery holder 708 and the conductors (not shown). Together, the battery holder 708 and the battery (not shown) may provide power to the real-time clock or be a source of backup power to the data logger 400.

Referring to FIG. 4, the data logger 400 is configured to provide long term (e.g., at least 15 years) maintenance free monitoring of the conditions inside a corrosive environment (e.g., in the vault 12 illustrated in FIGS. 1 and 14). For example, both the housing assembly 408 and the housing assembly 408' (see FIGS. 16 and 17) are configured to be submersible in water and to protect the electrical components 404 (see FIGS. 9-11 and 13) therein from exposure to the water when the housing assemblies are submerged. Referring to FIG. 11, the enclosure 554 provides additional protection from corrosive air and/or gases (e.g., inside the vault 12 illustrated in FIGS. 1 and 14). The fan 574 draws a sample of the internal atmosphere 104 (see FIG. 1) into the enclosure 554 for use by the sensor(s) 402A (see FIGS. 14 and 15). Thus, referring to FIG. 14, the sensor(s) 402A are exposed to any corrosive air and/or gases for only a brief period of time. Additionally, at least some of the electrical components 404 are configured to power down between uses.

While above the data logger 400 has been described as including the fan 574, the data logger 400 may alternatively include other types of air moving devices. For example, a pump may be used instead and in place of the fan 574.

The foregoing described embodiments depict different components contained within, or connected with, different other components. It is to be understood that such depicted architectures are merely exemplary, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations,"

without other modifiers, typically means at least two recitations, or two or more recitations).

Accordingly, the invention is not limited except as by the appended claims.

The invention claimed is:

1. A monitoring system for installation inside an underground vault, the monitoring system comprising:
   a housing comprising at least one aperture;
   a processor positioned inside the housing;
   a memory connected to the processor, the memory being configured to store data received from the processor;
   at least one sensor operable to monitor values of at least one parameter inside the underground vault and send a monitoring signal to the processor, the processor being configured to receive the monitoring signal and provide the data to the memory based at least in part on the monitoring signal;
   an enclosure positioned inside the housing, the at least one sensor being positioned inside the enclosure, the enclosure comprising an inlet in fluid communication with the at least one aperture; and
   an air moving device configured to be activated before the at least one sensor obtains the values of the at least one parameter, the air moving device, when activated, moving air into or out of the enclosure to thereby draw vault air from inside the underground vault into the enclosure through the inlet and the at least one aperture, the processor being positioned outside the enclosure.

2. The monitoring system of claim 1, wherein the air moving device is configured to remain activated for a predetermined period of time,
   the predetermined period of time is sufficient for the air moving device to replace air inside the enclosure with the vault air, and
   the air moving device is configured to be deactivated after the predetermined period of time.

3. The monitoring system of claim 2, wherein the processor is configured to activate and deactivate the air moving device.

4. The monitoring system of claim 1, further comprising:
   a filter positioned at or near the inlet, the filter filtering the vault air before the vault air enters the enclosure.

5. The monitoring system of claim 1, further comprising:
   one or more heat generating components positioned inside at least one structure comprising at least one of the enclosure and the housing, the one or more heat generating components helping to prevent moisture from condensing inside the at least one structure.

6. The monitoring system of claim 5, wherein each of the one or more heat generating components is a resistor.

7. The monitoring system of claim 1, further comprising:
   a conduit extending from the inlet, through the at least one aperture, and into the underground vault, the conduit conducting the vault air from the underground vault into the enclosure, the conduit comprising a filter configured to filter the vault air before the vault air enters the enclosure.

8. The monitoring system of claim 7, wherein the conduit has a distal end positioned near a bottom of the underground vault, and
   the conduit has a plurality of openings each formed at or near the distal end.

9. The monitoring system of claim 1, further comprising:
   a power unit configured to draw power from a power source located inside the underground vault and provide the power the processor, the air moving device, and the at least one sensor.

10. The monitoring system of claim 1, further comprising:
    a communication interface connected to the processor, the communication interface being configured to transmit data signals received from the processor to at least one external device.

11. The monitoring system of claim 10, wherein the at least one external device is a ventilator, and
    the data signals comprise instructions that instruct the ventilator to modify an internal environment inside the underground vault.

12. The monitoring system of claim 1, wherein the housing is configured to trap air inside an interior of the housing,
    the enclosure is positioned inside the interior,
    the at least one aperture is formed in a lower portion of the housing, and
    the air trapped inside the interior preventing water from entering the interior through the at least one aperture.

13. A monitoring system for installation inside an underground vault, the monitoring system comprising:
    a housing comprising at least one aperture;
    a processor positioned inside the housing;
    a memory connected to the processor, the memory being configured to store data received from the processor;
    at least one sensor operable to monitor values of at least one parameter inside the underground vault and send a monitoring signal to the processor, the processor being configured to receive the monitoring signal and provide the data to the memory based at least in part on the monitoring signal;
    an enclosure positioned inside the housing, the at least one sensor being positioned inside the enclosure, the enclosure comprising an inlet in fluid communication with the at least one aperture; and
    a fan configured to be activated before the at least one sensor obtains the values of the at least one parameter, the fan, when activated, moving air into or out of the enclosure to thereby draw vault air from inside the underground vault into the enclosure through the inlet and the at least one aperture, the processor being positioned outside the enclosure to protect the processor from the vault air.

14. The monitoring system of claim 13, wherein the fan is configured to remain activated for a predetermined period of time,
    the predetermined period of time is sufficient for the fan to replace air inside the enclosure with the vault air, and
    the fan is configured to be deactivated after the predetermined period of time.

15. The monitoring system of claim 14, wherein the processor is configured to activate and deactivate the fan.

16. The monitoring system of claim 13, further comprising:
    a filter positioned at or near the inlet, the filter filtering the vault air before the vault air enters the enclosure.

17. The monitoring system of claim 13, further comprising:
    one or more heat generating components positioned inside at least one structure comprising at least one of the enclosure and the housing, the one or more heat generating components helping to prevent moisture from condensing inside the at least one structure.

18. The monitoring system of claim 17, wherein each of the one or more heat generating components is a resistor.

19. The monitoring system of claim 13, further comprising:
a conduit extending from the inlet, through the at least one aperture, and into the underground vault, the conduit conducting the vault air from the underground vault into the enclosure, the conduit comprising a filter configured to filter the vault air before the vault air enters the enclosure.

20. The monitoring system of claim 19, wherein the conduit has a distal end positioned near a bottom of the underground vault, and
the conduit has a plurality of openings each formed at or near the distal end.

21. The monitoring system of claim 13, further comprising:
a power unit configured to draw power from a power source located inside the underground vault and provide the power the processor, the fan, and the at least one sensor.

22. The monitoring system of claim 13, further comprising:
a communication interface connected to the processor, the communication interface being configured to transmit data signals received from the processor to at least one external device.

23. The monitoring system of claim 22, wherein the at least one external device is a ventilator, and
the data signals comprise instructions that instruct the ventilator to modify an internal environment inside the underground vault.

24. The monitoring system of claim 13, wherein the housing is configured to trap air inside an interior of the housing,
the enclosure is positioned inside the interior,
the at least one aperture is formed in a lower portion of the housing, and
the air trapped inside the interior preventing water from entering the interior through the at least one aperture.

* * * * *